(12) United States Patent
Pan

(10) Patent No.: US 10,976,589 B2
(45) Date of Patent: Apr. 13, 2021

(54) DISPLAY PANEL HAVING A PATTERNED LIGHT SHIELDING LAYER PROTECTED BY A PROTECTIVE STRUCTURE

(71) Applicant: Himax Display, Inc., Tainan (TW)

(72) Inventor: Po-Hung Pan, Tainan (TW)

(73) Assignee: Himax Display, Inc., Tainan (TW)

( * ) Notice: Subject to any disclaimer, the term of this patent is extended or adjusted under 35 U.S.C. 154(b) by 0 days.

(21) Appl. No.: 15/955,660

(22) Filed: Apr. 17, 2018

(65) Prior Publication Data
US 2019/0317360 A1 Oct. 17, 2019

(51) Int. Cl.
*G02F 1/1335* (2006.01)
*G02F 1/1333* (2006.01)
*G02F 1/1339* (2006.01)

(52) U.S. Cl.
CPC ...... *G02F 1/133512* (2013.01); *G02F 1/1339* (2013.01); *G02F 1/133308* (2013.01)

(58) Field of Classification Search
CPC ......... G02F 1/133308; G02F 1/133512; G02F 1/1339; G02F 2202/28; G02F 1/133509
See application file for complete search history.

(56) References Cited

U.S. PATENT DOCUMENTS

| | | | | |
|---|---|---|---|---|
| 2002/0005824 | A1* | 1/2002 | Oshitani | G02F 1/133603 345/76 |
| 2009/0086120 | A1* | 4/2009 | Sasaki | G02F 1/133308 349/58 |
| 2011/0084944 | A1* | 4/2011 | Bae | G02B 26/004 345/205 |
| 2011/0228401 | A1 | 9/2011 | Fukushima et al. | |
| 2012/0169963 | A1 | 7/2012 | Park | |
| 2012/0268402 | A1* | 10/2012 | Wang | G06F 3/041 345/173 |
| 2013/0128192 | A1* | 5/2013 | Ishikawa | G02F 1/133512 349/96 |

(Continued)

FOREIGN PATENT DOCUMENTS

| | | |
|---|---|---|
| CN | 1322360 | 6/2007 |
| EP | 2112549 | 10/2009 |

(Continued)

OTHER PUBLICATIONS

"Search Report of Europe Counterpart Application", dated Jan. 22, 2019, p. 1-p. 8.

(Continued)

*Primary Examiner* — Yuzhen Shen
(74) *Attorney, Agent, or Firm* — JCIPRNET

(57) ABSTRACT

A display panel according to an embodiment has a first region and a second region surrounded by the first region. The display panel may include a top substrate, a bottom substrate opposite to the top substrate, and a sealant and a display medium layer disposed between the top substrate and the bottom substrate. The top substrate may include a blanket anti-reflective layer disposed on an upper surface of the top substrate, a patterned light shielding layer disposed in the first region of the display panel, and a packaging structure packing the patterned light shielding layer. The patterned light shielding layer may be in direct contact with an upper surface of the blanket anti-reflective layer.

14 Claims, 25 Drawing Sheets

(56) References Cited

U.S. PATENT DOCUMENTS

| | | | |
|---|---|---|---|
| 2015/0211707 A1* | 7/2015 | Watanabe | G09G 3/3607 345/667 |
| 2016/0216552 A1* | 7/2016 | Jin | B32B 9/041 |
| 2016/0253973 A1* | 9/2016 | Nishida | G09G 3/3614 345/209 |
| 2017/0099741 A1* | 4/2017 | Shin | G06F 3/041 |
| 2017/0363798 A1 | 12/2017 | Hirayama et al. | |
| 2018/0061923 A1 | 3/2018 | Tang | |
| 2018/0335662 A1* | 11/2018 | Iwase | G09F 9/00 |
| 2019/0237533 A1* | 8/2019 | Kim | G06F 3/04164 |

FOREIGN PATENT DOCUMENTS

| | | |
|---|---|---|
| EP | 2876491 | 5/2015 |
| EP | 3299873 | 3/2018 |
| JP | 2003228053 | 8/2003 |
| JP | 2005062619 | 3/2005 |
| JP | 2011003537 | 1/2011 |
| JP | 2011128481 | 6/2011 |
| JP | 2012150418 | 8/2012 |
| JP | 2012150418 A * | 8/2012 ............... G09F 9/00 |
| JP | 2016029431 | 3/2016 |
| KR | 20090071417 | 7/2009 |
| TW | I331480 | 10/2010 |
| WO | 2007069870 | 6/2007 |

OTHER PUBLICATIONS

"Office Action of Taiwan Counterpart Application," dated Apr. 26, 2019, p. 1-p. 4.

"Office Action of Korea Counterpart Application," dated Apr. 17, 2019, p. 1-p. 10.

"Office Action of Japan Counterpart Application," dated Jul. 30, 2019, p. 1-p. 4.

\* cited by examiner

DISPLAY PANEL HAVING A PATTERNED LIGHT SHIELDING LAYER PROTECTED BY A PROTECTIVE STRUCTURE

BACKGROUND OF THE INVENTION

1. Field of the Invention

The present invention generally relates to an electronic device, in particular, to a display panel.

2. Description of Related Art

A patterned light shielding layer is usually added to a display panel to delineate the display area. The patterned light shielding layer can be a black matrix, have a frame-like pattern, or a matrix-like pattern, and the region surrounded by the frame-like pattern or the matrix-like pattern serves as the display region. Besides defining the display area, the patterned light shielding layer might also prevent unwanted light leakage.

In a typical display panel, a display medium layer is sandwiched between a top and a bottom substrate. The top substrate and the bottom substrate are kept together via a sealant or an adhesive whilst the display medium layer is sandwiched between the top substrate and the bottom substrate to form a display cell. Once the display cell is assembled, a patterned light shielding layer is formed on the outer surface of the top substrate via a wet process such as ink-jet, screen or APR printing. The patterned light shielding layer is disposed on a non-display region of the display cell to prevent light-leakage and to improve the display contrast. The patterned light shielding layer may be exposed to adventitious moisture or contaminants from the environment, or it might be harmed by external forces. Damages to the patterned light shielding layer may compromise the performance of the display panel.

SUMMARY OF THE INVENTION

Accordingly, the present invention is directed to a display panel including a packaging structure for the patterned light shielding layer.

Accordingly, the present invention is directed to a display panel including a sidewall pattern to protect the patterned light shielding layer.

According to an embodiment, a display panel may have a first region and a second region surrounded by the first region. The display panel may include a top substrate, a bottom substrate opposite to the top substrate, and a sealant and a display medium layer disposed between the top substrate and the bottom substrate. The sealant may be located in the first region of the display panel and it may surround the display medium layer. The top substrate may include a blanket anti-reflective layer disposed on an upper surface of the top substrate, a patterned light shielding layer disposed in the first region of the display panel, and a packaging structure packing the patterned light shielding layer. The patterned light shielding layer may be in direct contact with an upper surface of the blanket anti-reflective layer.

According to an embodiment, the packaging structure may include a protective layer in physical contact with a top surface of the patterned light shielding layer.

According to an embodiment, the protective layer may completely cover the upper surface of the blanket anti-reflective layer in the second region.

According to an embodiment, the protective layer may cover an outer side surface of the support plate, a side surface of the sealant, a side surface of the bottom substrate, and a bottom surface of the bottom substrate.

According to an embodiment, the protective layer may extend from the top surface of the patterned light shielding layer toward the second region and it may have an opening Orevealing at least a portion of the second region of the display panel.

According to an embodiment, a material of the protective layer may include an inorganic material.

According to an embodiment, the patterned light shielding layer may have an inner edge surface and an outer edge surface, the inner edge surface may define a boundary between the first region and the second region, the outer edge surface may be opposite to the inner edge surface, and the packaging structure may include at least one sidewall pattern arranged along and in contact with at least one of the inner edge surface of the patterned light shielding layer and the outer edge surface of the patterned light shielding layer.

According to an embodiment, a height of the sidewall pattern may be not less than a thickness of the patterned light shielding layer at the at least one of the inner edge surface and the outer edge surface.

According to an embodiment, the protective layer may reveal a top surface of the sidewall pattern.

According to an embodiment, a material of the sidewall pattern may include an inorganic material.

According to an embodiment, the protective layer may include a portion disposed on the blanket anti-reflective layer in the second region and the sidewall pattern may be positioned between the patterned light shielding layer and the portion of the protective layer.

According to an embodiment, an upper surface of the packaging structure may be modified, and a second layer of hydrophobic material may be foimed thereon.

According to an embodiment, the upper surface of the blanket anti-reflective layer in the second region may be modified, and a second layer of hydrophobic material may be formed thereon.

According to an embodiment, a display panel may have a first region and a second region surrounded by the first region. The display panel may include a top substrate, a bottom substrate opposite to the top substrate, and a display medium layer disposed between the top substrate and the bottom substrate. The top substrate may include a support plate, a blanket anti-reflective layer disposed on the support plate, a patterned light shielding layer disposed on the blanket anti-reflective layer, and a sidewall pattern. The patterned light shielding layer may be located within the first region of the display panel, and it may have an inner edge surface and an outer edge surface. The inner edge surface may define a boundary between the first region and the second region of the display panel, and the outer edge surface may be opposite to the inner edge surface. The sidewall pattern may be arranged along at least one of the inner edge surface or the outer edge surface of the patterned light shielding layer.

According to an embodiment, a height of the sidewall pattern may be not less than a thickness of the patterned light shielding layer.

According to an embodiment, the sidewall pattern may be localized between the outer edge surface of the patterned light shielding layer and a side edge of the display panel.

According to an embodiment, the sidewall pattern may include an outer sidewall pattern in physical contact with the outer edge surface of the patterned light shielding layer and an inner sidewall pattern in physical contact with the inner edge surface of the patterned light shielding layer.

According to an embodiment, a lateral width of the outer sidewall pattern may be greater than a lateral width of the inner sidewall pattern.

According to an embodiment, a display panel may further include a protective layer in physical contact with a top surface of the patterned light shielding layer.

According to an embodiment, a material of the sidewall pattern may be different than a material of the protective layer.

In view of the above, the display panel in accordance with some embodiments in the disclosure includes the packaging structure disposed on the outer surface of the support plate to cover and package the patterned light shielding layer thereon. The packaging structure may be formed to shield the top surface and at least one lateral edge surface of the patterned light shielding layer. Accordingly, the packaging structure of the display panel may provide the desired protective function for patterned light shielding layer of the display panel.

BRIEF DESCRIPTION OF THE DRAWINGS

The accompanying drawings are included to provide further understanding of the invention, and are incorporated in and constitute a part of this specification. The drawings illustrate embodiments of the invention and, together with the description, serve to explain the principles of the invention.

Figure 1:
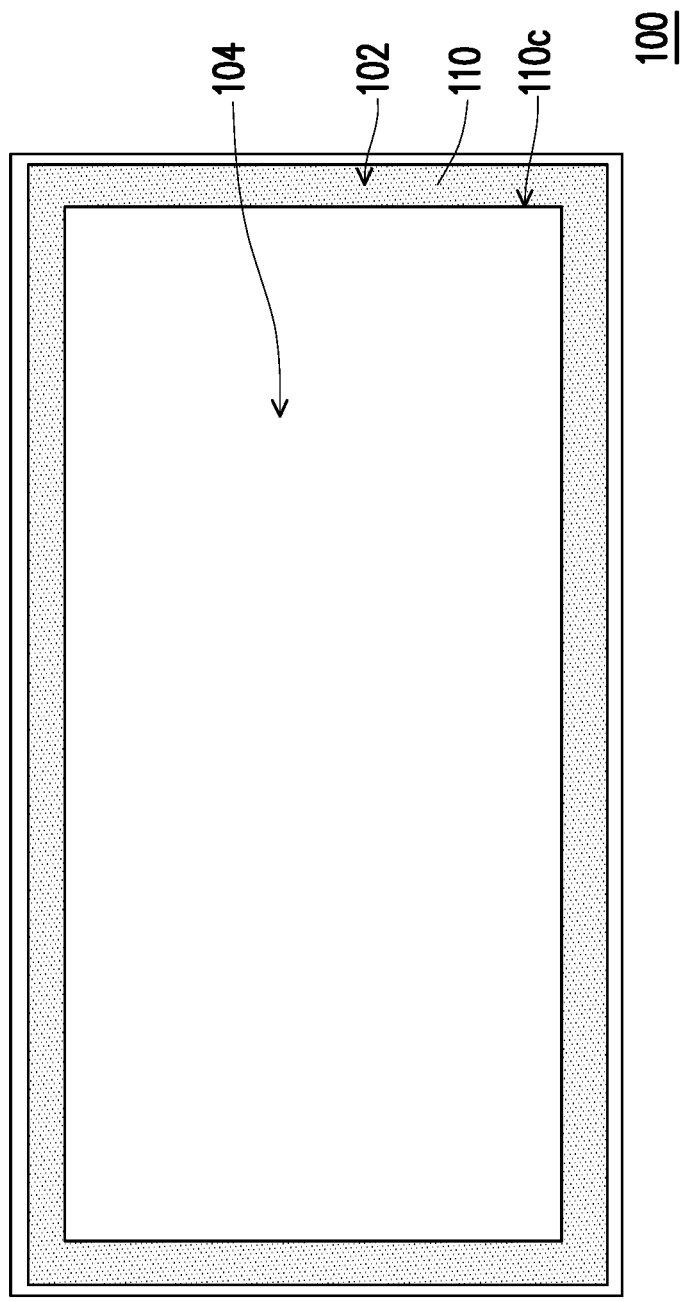
FIG. 1 schematically illustrates a top view of a display panel in accordance with an embodiment of the present disclosure.

In the drawings, the first layer of hydrophobic material 180 is represented with a significantly enlarged thickness compared to the other components of the embodiments for the sake of clarity of the drawings. Even though the protective layer is shown as a flat layer, it may be conformal with the elements over which it is disposed. Furthermore, the thickness of the several components may not be represented in scale. Rather, the relative dimensions of the illustrated components might have been altered in the drawings for the sake of clarity.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the descriptions to refer to the same or like parts.

In the disclosure of the present invention, the locution "an element A is disposed on an element B", used to describe a positional relationship, encompasses the possibilities of one or multiple other elements disposed between the element A and the element B, as well as the case of no other elements existing between the element A and the element B.

FIG. 1 schematically illustrates a top view of a display panel 100 in accordance with an embodiment of the present disclosure. The display panel 100 may include a first region 102 and a second region 104 located beside the first region 102. The first region 102 may have a frame-like pattern when viewed from the top, and it may surround the second region 104. In addition, the display panel 100 may have a patterned light shielding layer 110 located within the first region 102. Specifically, the patterned light shielding layer 110 may have a frame-like pattern in the present embodiment. The first region 102 may be considered as the region where the patterned light shielding layer 110 is disposed and a boundary between the first region 102 and the second region 104 of the display panel 100 may be defined by an inner edge surface 110c of the patterned light shielding layer 110. The patterned light shielding layer 110 may have a light shielding effect. Therefore, the display light of the display panel 100 may be obstructed or shielded by the patterned light shielding layer 110, so that the displayed image may be presented in the second region 104. In an alternative embodiment, the patterned light shielding layer 110 may be disposed following other patterns or layers, according to the requirements of the design.

Figure 2A:
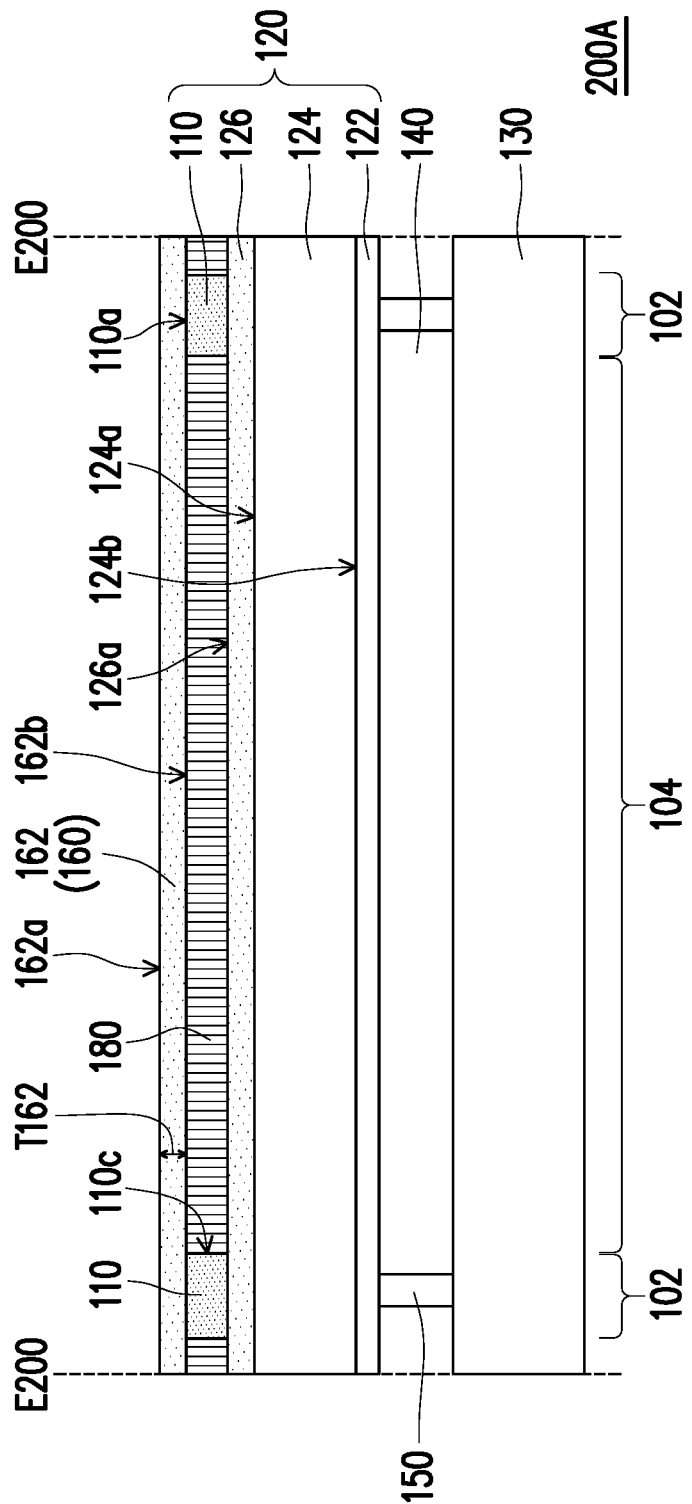
FIG. 2A-2H show schematic cross sections of respective display panels according to some embodiments of the present disclosure.

FIG. 2A shows a cross section of a display panel according to an embodiment of the present disclosure. As shown in a cross section of FIG. 2A, the display panel 200A may include a top substrate 120, a bottom substrate 130 opposite to the top substrate 120, a display medium layer 140, a sealant 150 disposed in between the top substrate 120 and the bottom substrate 130, and a packaging structure 160 disposed on top of the top substrate 120. The display panel 200A may have a top view similar to the display panel 100 illustrated in FIG. 1 so that the display panel 200A has the first region 102 and the second region 104 surrounded by the first region 102. The top substrate 120 and the bottom substrate 130 are assembled via the sealant 150. The display medium layer 140 may be sandwiched between the top substrate 120 and the bottom substrate 130 and surrounded by the sealant 150. The sealant 150 may be disposed in the first region 102 of the display panel 200A, whilst the display medium layer 140 may be mostly located within the second region 104 of the display panel 200A. The display medium layer 140 may be made of liquid crystals, so that the top substrate 120, the bottom substrate 130, the display medium layer 140, and the sealant 150 may serve as a liquid crystals cell, but the disclosure is not limited thereto.

The top substrate 120 may include the patterned light shielding layer 110 having a top view pattern as the patterned light shielding layer 110 illustrated in FIG. 1, an electrode layer 122, a support plate 124 and a blanket anti-reflective layer 126. The blanket anti-reflective layer 126 is disposed on an upper surface 124a of the support plate 124 farther away from the display medium layer 140 and the patterned light shielding layer 110 is disposed on an upper surface 126a of the blanket anti-reflective layer 126. The electrode layer 122 may be disposed on a bottom surface 124b of the support plate 124 closer to the display medium layer 140.

The electrode layer 122 may be made of ITO or any other material that is conductive and transparent to the display light, and the support plate 124 may be made of glass, but the disclosure is not limited thereto. In addition, though the drawing presents the bottom substrate 130 as a plate-like structure, the bottom substrate 130 may be a transistor array substrate comprising another support substrate such as a glass plate, or a silicon backplane (not shown) and a transistor array such as a thin film transistor array or a CMOS (Complementary Metal-Oxide Semiconductor) device array (not shown) thereon, wherein the transistor array and the electrode layer 122 may be used for providing the driving electric field to drive the display medium layer 140. Accordingly, the display panel 200A may be a Thin Film Transistor Liquid Crystal Display (TFT-LCD) panel or an LCoS (Liquid Crystal on Silicon) display panel. In some alternative embodiments, the electrode layer 122 may be omitted based on the driving circuit design of the display panel 200A.

The blanket anti-reflective layer 126 may extend the whole upper surface 124a of the support plate 124, whilst the patterned light shielding layer 110 may be disposed within the first region 102 of the display panel 200A. Accordingly, a boundary between the first region 102 and the second region 104 of the display panel 200A may be defined by an inner edge surface 110c of the patterned light shielding layer 110. Alternatively stated, the blanket anti-reflective layer 126 may uninterruptedly run on the support plate 124 over the area circumscribed by a side edge E200 of the display panel 200A, whilst the patterned light shielding layer 110 may be confined within the first region 102 of the display panel 200A. A material of the blanket anti-reflective layer 126 may be silicon oxide ($SiO_x$), titanium oxide ($TiO_x$) or a combination of both exposing surface hydroxyl groups which may react with the hydrophobic material to form a first layer of hydrophobic material 180 thereon. The blanket anti-reflective layer 126 may be a stacked multi-layer thin film which may have a structure of $SiO_x$—$TiO_x$—$SiO_x$—$TiO_x$—$SiO_x$, for example, but it is not limited thereto. The thickness of each individual $SiO_x$ layer of the stacked multi-layer structure may be in a range from 5 nm to 300 nm, while the thickness of each individual $TiO_x$ layer of the stacked multi-layer structure may be in a range from 5 nm to 100 nm. The reflective index at wavelength of 550 nm of one $SiO_x$ layer and one $TiO_x$ layer may be close to 1.5 and 2.3, respectively.

The patterned light shielding layer 110 may be disposed on the blanket anti-reflective layer 126 in the first region 102 of the display panel 200A. The patterned light shielding layer 110 may be in direct contact with an upper surface 126a of the blanket anti-reflective layer 126. The patterned light shielding layer 110 may present a sharp pattern and edges with good linearity. A material for the patterned light shielding layer 110 may include organic inks, but the disclosure is not limited thereto. The patterned light shielding layer 110 may be sensitive to adventitious moisture or other environmental contaminants. For example, if the patterned light shielding layer 110 enters in contact with water, UV light or other environmental contaminants that might damage it, its sharp pattern, surface or the linearity of its edges may be compromised, deteriorating the performance and shortening the lifetime of the display panel. Furthermore, external forces, such as the ones generated by accidental impacts, may also harm the patterned light shielding layer 110, compromising the quality of the displayed image.

Therefore, the packaging structure 160 may be included to protect the patterned light shielding layer 110 against damages produced by contaminants or collisions. In the embodiment, the packaging structure 160 may be constituted by a protective layer 162 disposed on the blanket anti-reflective layer 126 and in contact with a top surface 110a of the patterned light shielding layer 110. The protective layer 162 may extend over all the regions of the display panel 200A, that is, it may completely cover the upper surface 126a of the blanket anti-reflective layer 126. In other words, the protective layer 162 may spread over the entire area circumscribed by the side edge E200 of the display panel 200A. The protective layer 162 may be in direct contact with the top surface 110a of the patterned light shielding layer 110 in the first region 102 of the display panel 200A. In some embodiments, the material of the protective layer 162 may include silicon oxide, titanium oxide, aluminium oxide and zinc oxide, but the disclosure is not limited thereto. A thickness T162 of the protective layer 162 is not particularly limited. For example, in one embodiment the protective layer 162 may have a thickness T162 of about 50 nanometers.

In the present embodiment, the upper surface 126a of the blanket anti-reflective layer 126 may be selectively functionalized with a layer of hydrophobic material 180. That is, the upper surface 126a of the blanket anti-reflective layer 126 may be subjected to a hydrophobic modification to form the layer of hydrophobic material 180, thus gaining hydrophobic properties. The material forming the layer of hydrophobic material 180 may include silanes, fluorinated silanes, long-chain alcohols or acids, but the disclosure is not limited thereto. Specifically, the material forming the layer of hydrophobic material 180 may contain hydroxyl groups to react with the exposed hydroxyl groups on the upper surface 126a of the blanket anti-reflective layer 126. The thickness of the layer of hydrophobic material 180 may be in the range from about 0.1 nanometers to about 90 nanometers, but the disclosure is not limited thereto. The layer of hydrophobic material 180 may be blank in the first region 102 of the display panel 200A, and it may surround the patterned light shielding layer 110 over the upper surface 126a of the blanket anti-reflective layer 126. The layer of hydrophobic material 180 may help during the manufacturing process to form the patterned light shielding layer 110 with sharp edges and good linearity. The layer of hydrophobic material 180 may be sandwiched between the blanket anti-reflective layer 126 and the protective layer 162. That is, a bottom surface 162b of the protective layer 162 opposite to an upper surface 162a may lie on top of the layer of hydrophobic material 180.

Figure 2B:
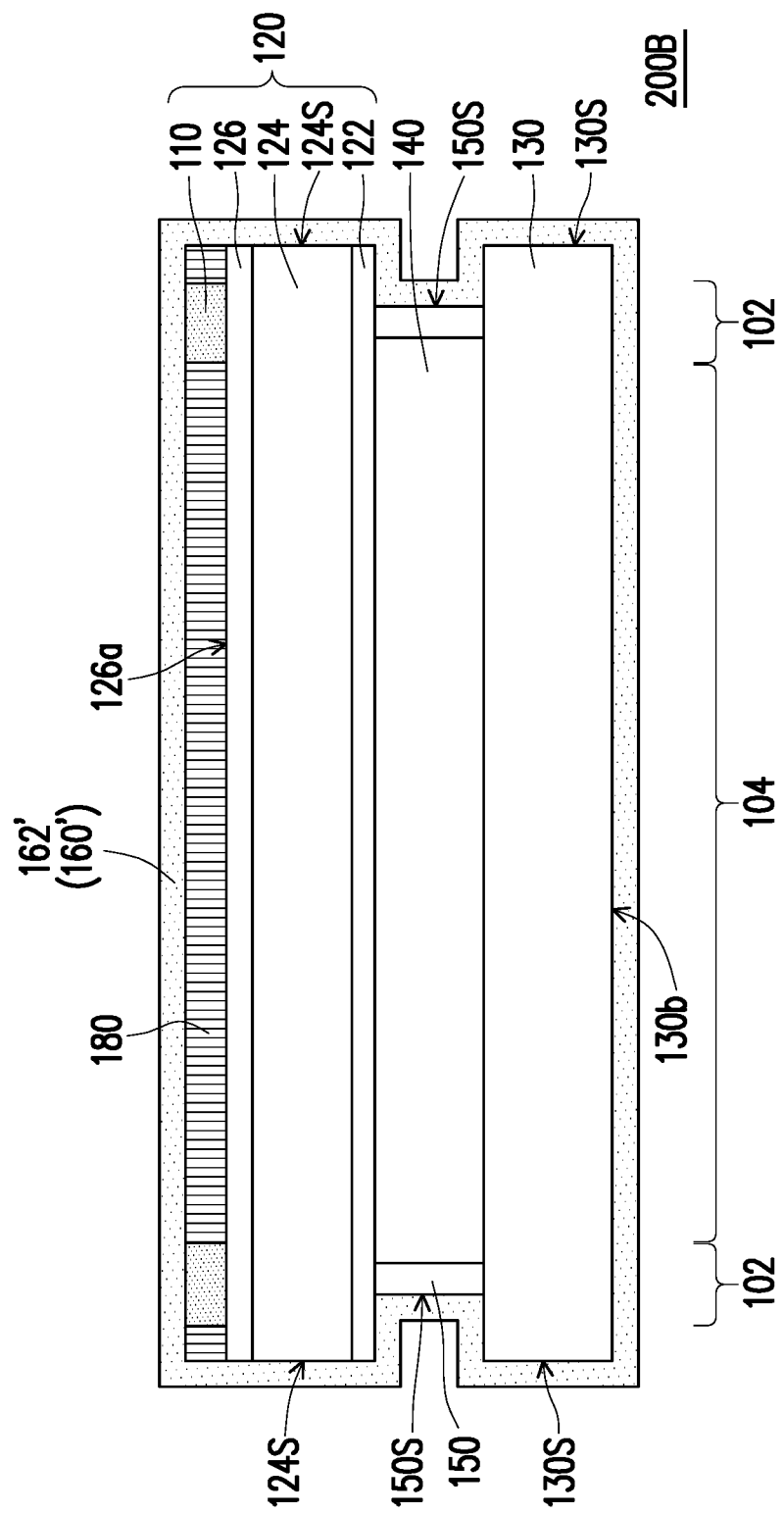

In FIG. 2B is shown a cross section of a display panel 200B according to another embodiment of the present disclosure. The structure of the display panel 200B shown in FIG. 2B may be an implementing example of an embodiment of the present disclosure. The display panel 200B shown in FIG. 2B is similar to the display panel 200A shown in FIG. 2A, and the same or similar reference numbers in the two embodiments represent the same or similar elements or components. The display panel 200B may include at least the top substrate 120 having the patterned light shielding layer 110, the bottom substrate 130, the display medium layer 140, the sealant 150, and the packaging structure 160'. In the display panel 200B shown in FIG. 2B, the packaging structure 160' includes a protective layer 162' which may extend around the whole display cell, completely encasing it. That is, the protective layer 162' may cover the side surfaces 124S of the support plate 124, the side surfaces 130S and a bottom surface 130b of the bottom substrate 130, and the outer side surfaces 150S of a sealant 150. Other embodiments of the present disclosure discussed below may include the protective layer 162' wrapping the entire outer surface of the display panel similarly to what is just discussed.

Figure 2C:
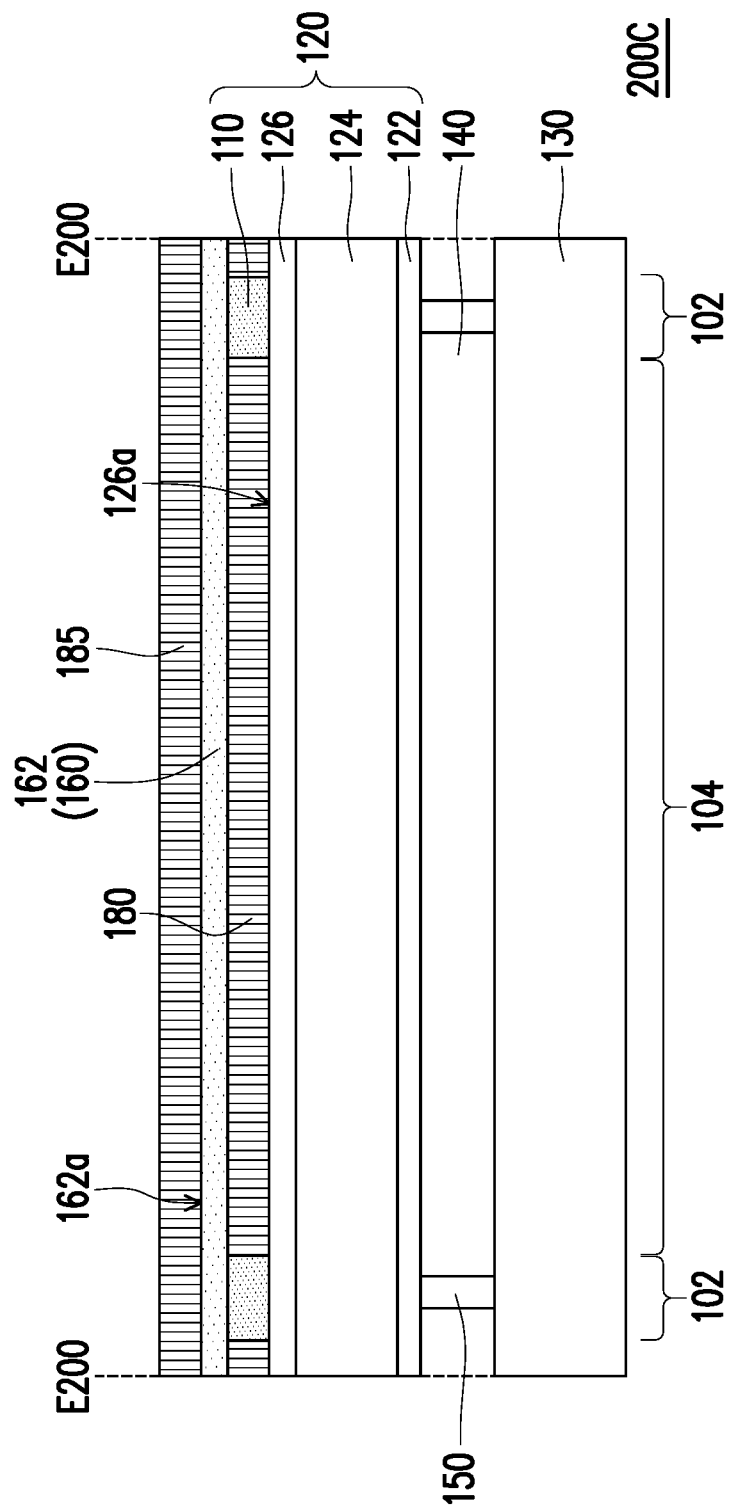
Figure 2D:
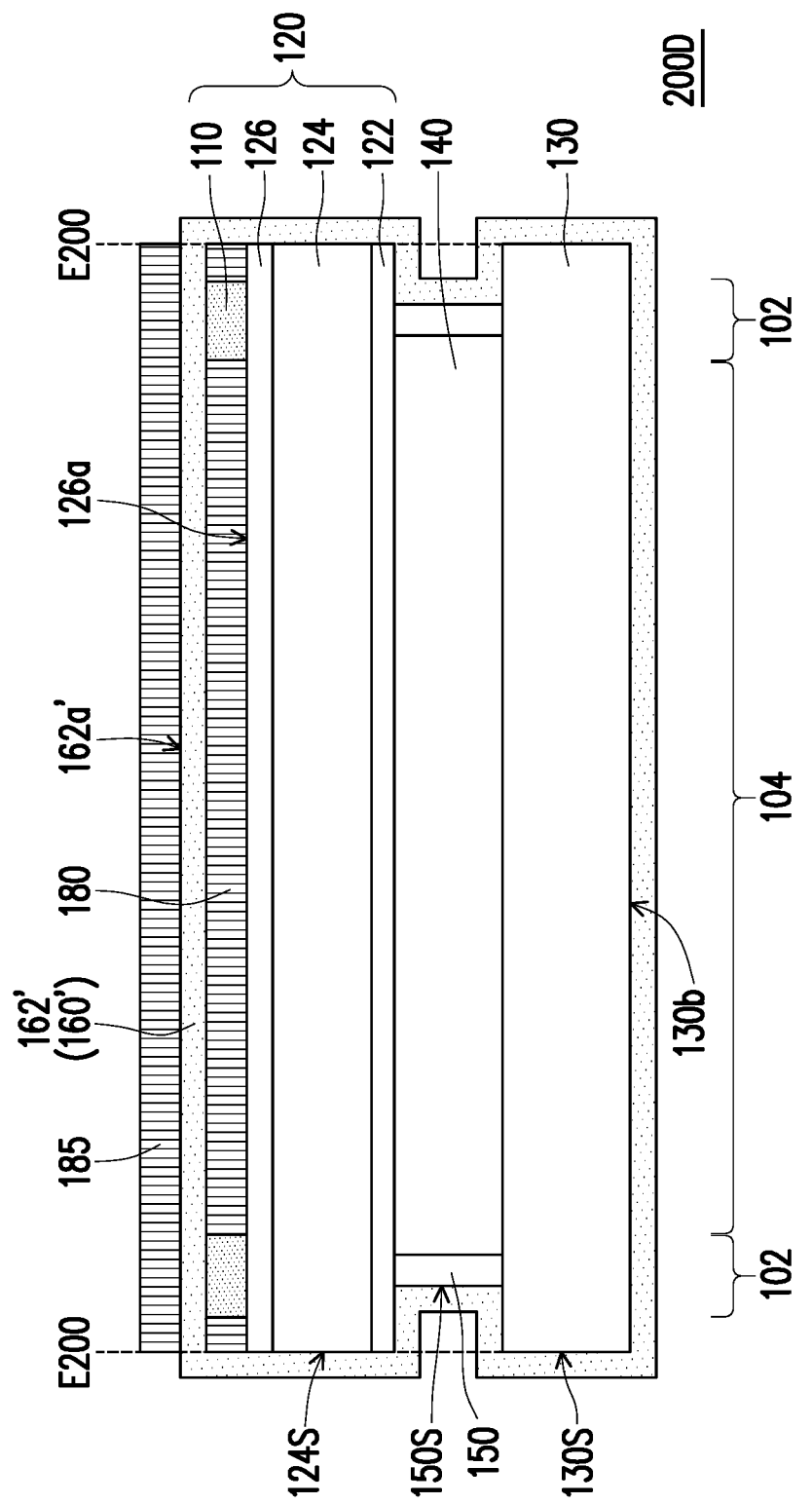

In some alternative embodiments, portions or the whole upper surface of the protective layer may be similarly functionalised with hydrophobic material. For example, a display panel 200C shown in FIG. 2C is similar to the display panel 200A in FIG. 2A. The display panel 200C may include at least the top substrate 120 having the patterned light shielding layer 110, the bottom substrate 130, the display medium layer 140, the sealant 150, the packaging structure 160 constructed by the protective layer 162 and the layer of hydrophobic material 180. The difference of the display panel 200C from the display panel 200A lies in that a further layer of hydrophobic material 185 is formed on an upper surface 162a of the protective layer 162. In addition, the display panel 200D shown in FIG. 2D is similar to the display panel 200B in FIG. 2B. The display panel 200D may include at least the top substrate 120 having the patterned light shielding layer 110, the bottom substrate 130, the display medium layer 140, the sealant 150, the packaging structure 160' constructed by the protective layer 162' and the layer of hydrophobic material 180, and the difference of the display panel 200D from the display panel 200B lies in that a further layer of hydrophobic material 185 is formed on an upper surface 162a' of the protective layer 162'. As shown in FIGS. 2C and 2D, the layer of hydrophobic material 185 may extend over the entire upper surface 162a (162a') of the protective layer 162 (160'), that is, it may cover the first region 102 and the second region 104 of the display panel 200C (200D), running uninterruptedly over the area circumscribed by a side edge E200 of the display panel 200C (200D). In the embodiments, the protective layer 162 (162') may be sandwiched between the layer of hydrophobic material 180 formed on an upper surface 126a of the blanket anti-reflective layer 126, and the layer of hydrophobic material 185 formed on the upper surface 162a (162a') of the protective layer 162 (162'). The material forming the layer of hydrophobic material 185 may include silanes, fluorinated silanes, long-chain alcohols or acids, but is not limited thereto. In some embodiments, the two layers of hydrophobic material 180 and 185 may be made of the same hydrophobic material, for example, they may both be made of fluorinated silanes. In some alternative embodiments the two layers of hydrophobic material 180 and 185 may be made of different materials. For example, the layer of hydrophobic material 180 may be made of silanes, and the layer of hydrophobic material 185 may be made of fluorinated silanes. Among its other functions, the layer of hydrophobic material 185 may help to further protect the display panel against adventitious water from the surrounding environment. That is, the water-repellent character of the exposed layer of hydrophobic material 185 may prevent moisture from infiltrating within the display panel or reaching the patterned light shielding layer 110.

Figure 2E:
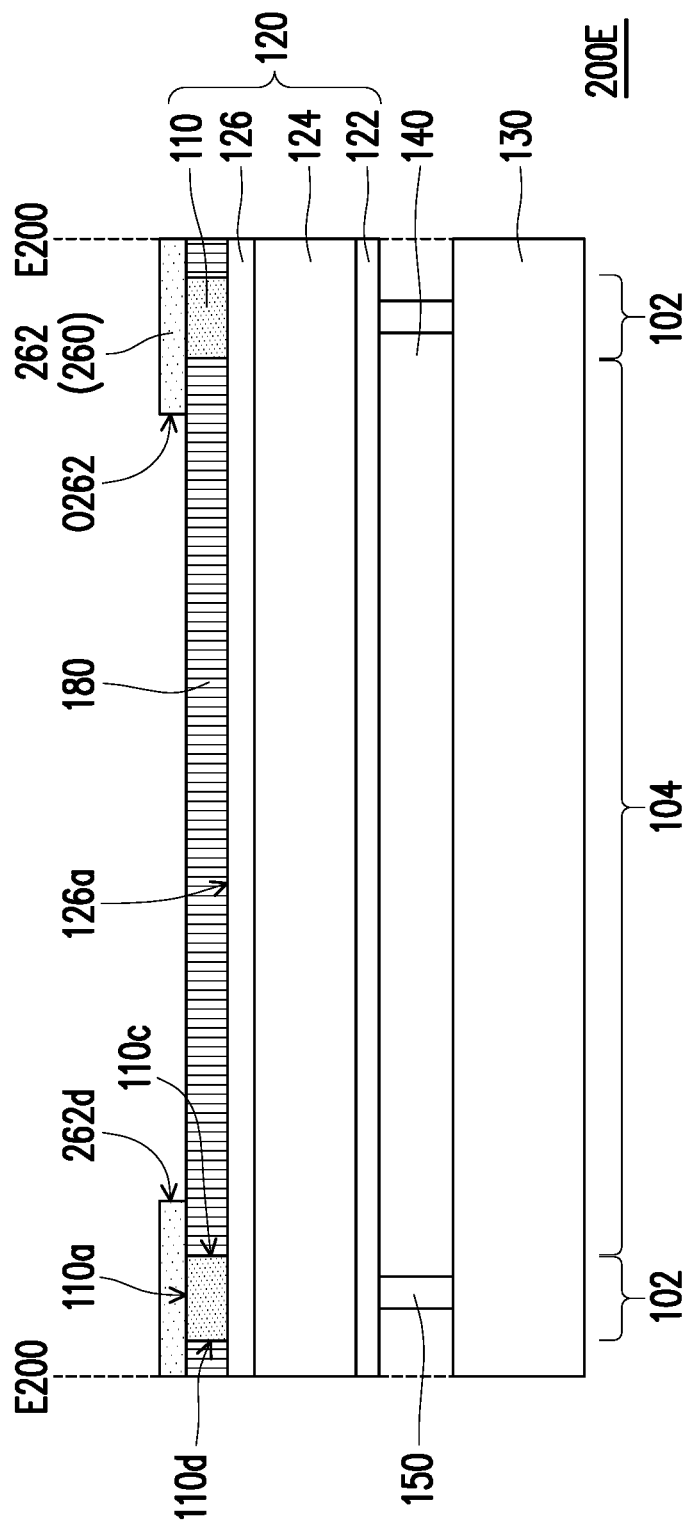

In FIG. 2E is shown a cross section of a display panel according to another embodiment of the present disclosure. The display panel 200E shown in FIG. 2E is similar to the display panel 200A shown in FIG. 2A and the same or similar reference numbers in the two embodiments represent the same or similar elements or components. The display panel 200E may include at least the top substrate 120 having the patterned light shielding layer 110, the bottom substrate 130, the display medium layer 140, the sealant 150, and the packaging structure 260. The embodiment shown in FIG. 2E differs from the embodiment shown in FIG. 2A as a protective layer 262 of the packaging structure 260 may not entirely cover the second region 104 of display panel 200E. Specifically, an opening O262 may exist in the protective layer 262 that may reveal at least a portion of the second region 104 of the display panel. In the embodiments where the opening O262 of the protective layer 262 is present, the exposed portion of the second region 104 may serve as a display region. Namely, the area surrounded by the opening O262 of the protective layer 262 may be considered as the area presenting the displayed image. The opening O262 may expose a portion of the layer of hydrophobic material 180 on the upper surface 126a of the blanket anti-reflective layer 126 in the second region 104 of the display panel 200E. That is, the protective layer 262 may cover only part of the layer of hydrophobic material 180, rather than the entirety of the layer of hydrophobic material 180 as it may happen for the top substrate 120 in the previous embodiment.

The protective layer 262 may laterally extend from the first region 102 towards the side edge E200 on the top substrate 120 in one direction, and it may laterally extend in an opposite direction towards the second region 104 of the display panel 200E without entirely covering the second region 104. That is, the protective layer 262 may be disposed on top of the patterned light shielding layer 110, and may extend outwardly to the side edge E200 of the display panel 200E, and inwardly to the second region 104 of the display panel 200E. The protective layer 262 may extend from the top surface 110a of the patterned light shielding layer 110 toward the second region 104 for about 200 μm to 1000 μm. In other words, there is a portion of the second region 104 extending between an inner edge surface 110c of the patterned light shielding layer 110 and an inner side surface 262d of the protective layer 262 that is covered by the protective layer 262 and that is not part of the display region. Rather, a boundary of the display region may be defined by the inner side surface 262d of the protective layer 262.

Figure 2F:
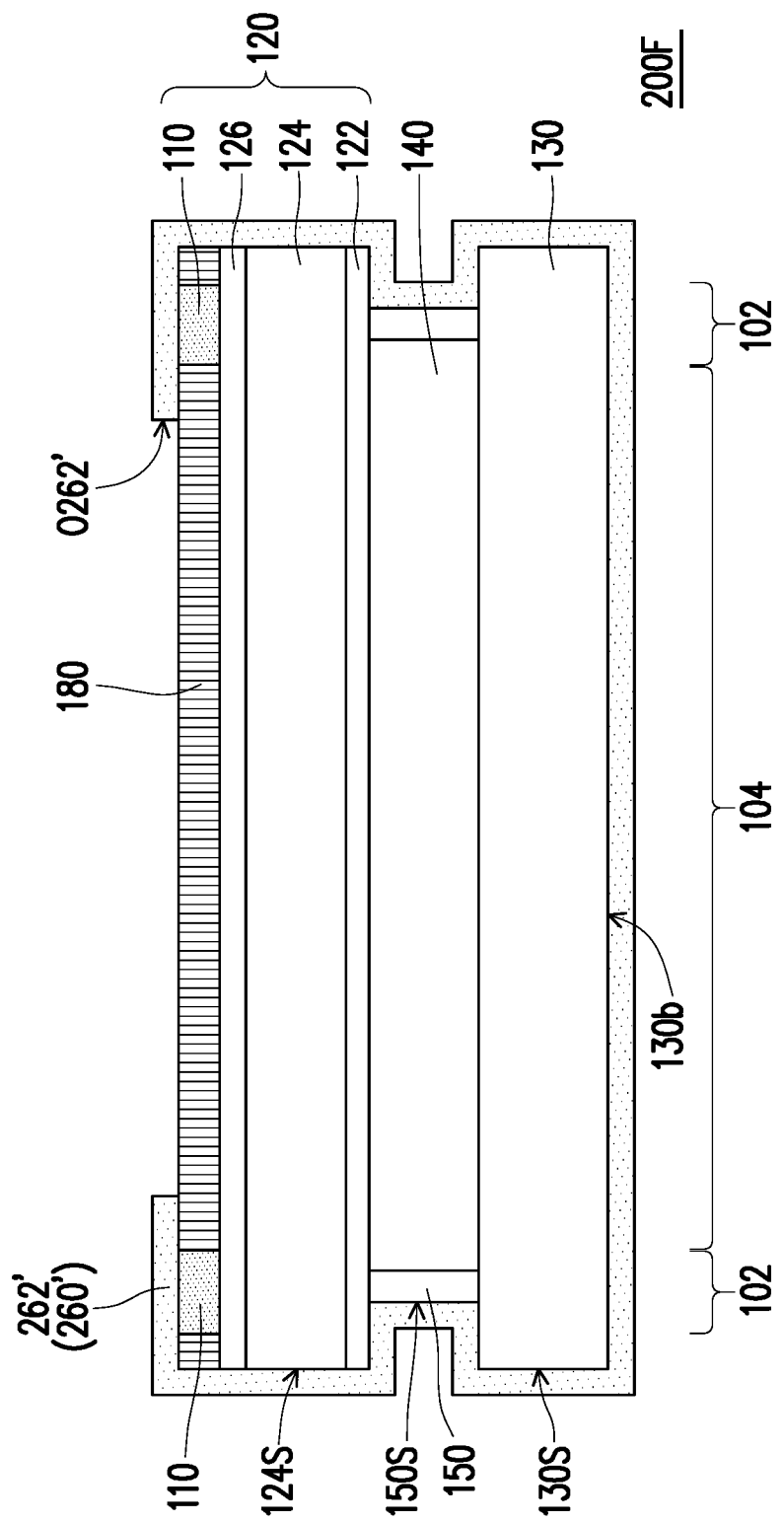

In FIG. 2F is shown a cross section of a display panel according to another embodiment of the present disclosure. The embodiment shown in FIG. 2F is similar to the embodiment shown in FIG. 2B, and the same or similar reference numbers in the two embodiments represent the same or similar elements or components. The display panel 200F may include the top substrate 120 having the patterned light shielding layer 110, the bottom substrate 130, the display medium layer 140, the sealant 150, and the packaging structure 260'. In the display panel 200F of the embodiment, a protective layer 262' of the packaging structure 260' on the top substrate 120 is different from the protective layer 162' of the packaging structure 160' in that the protective layer 262' has an opening O262' exposing a portion of the layer of the hydrophobic material 180 in the second region 104. The protective layer 262' may laterally extend from the top of the patterned light shielding layer 110 in the first region 102 towards the second region 104 of the display panel 200F without entirely covering the second region 104. Similar to the opening Odesign of the protective layer 262 illustrated in FIG. 2E, the opening O262' of the protective layer 262' may define the display region of the display panel 200F. In addition, the protective layer 262' may further cover the outer side surfaces 124S of the support plate 124, the outer side surfaces 150S of the sealant 150, and the outer side surfaces 130S and the bottom surface 130b of the bottom substrate 130, similar to the protective layer 162' illustrated in FIG. 2B.

Figure 2G:
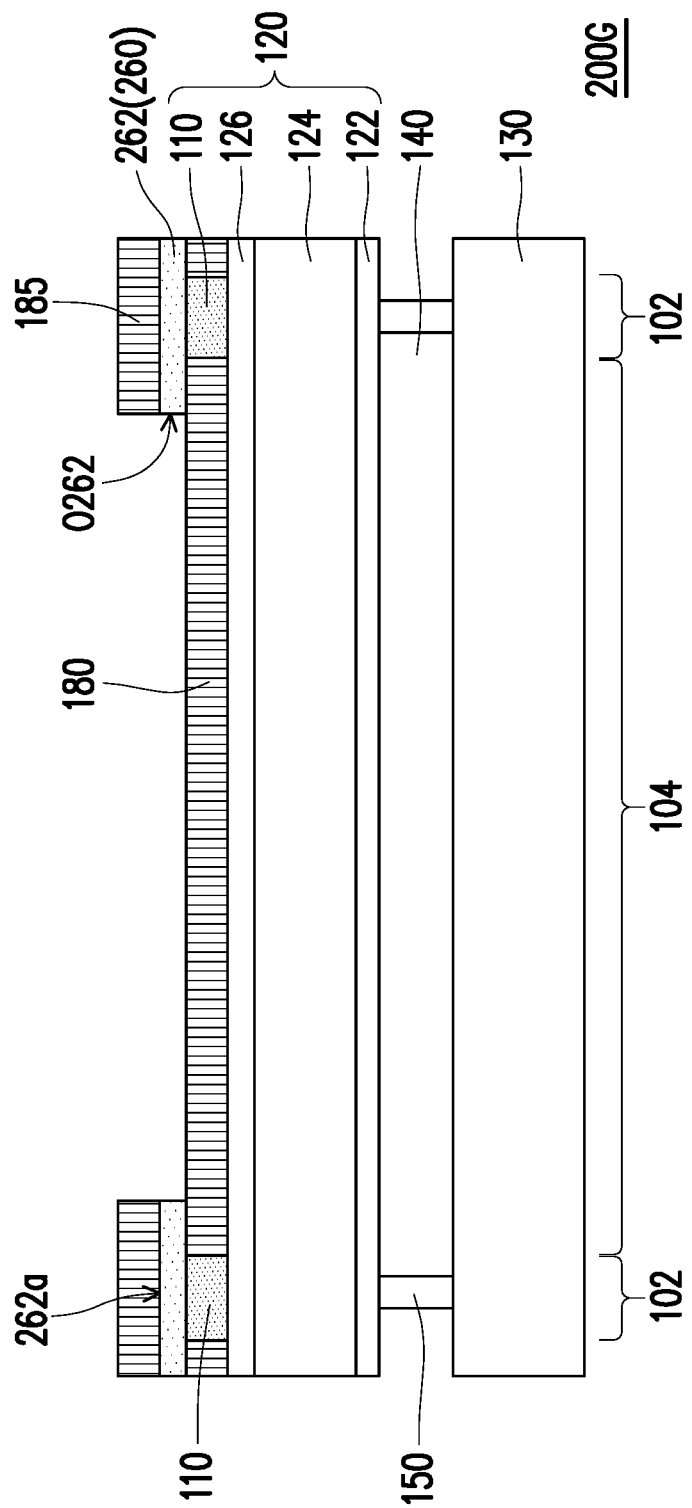

In FIG. 2G is shown a cross section of a display panel according to another embodiment of the present disclosure. The display panel 200G may include at least the top substrate 120 having the patterned light shielding layer 110, the bottom substrate 130, the display medium layer 140, the sealant 150, and the packaging structure 260. The embodiment shown in FIG. 2G differs from the embodiment shown in FIG. 2E as a further layer of hydrophobic material 185 exists on an upper surface 262a of the protective layer 262. In the present embodiment, the layer of hydrophobic material 180 at the region (the display region) defined by the opening O262 of the protective layer 262 is exposed, such that the layer of hydrophobic material 180 and the layer of hydrophobic material 185 continuously extends over the entire outer top surface of the display panel 200G to provide the water-repellent function.

Figure 2H:
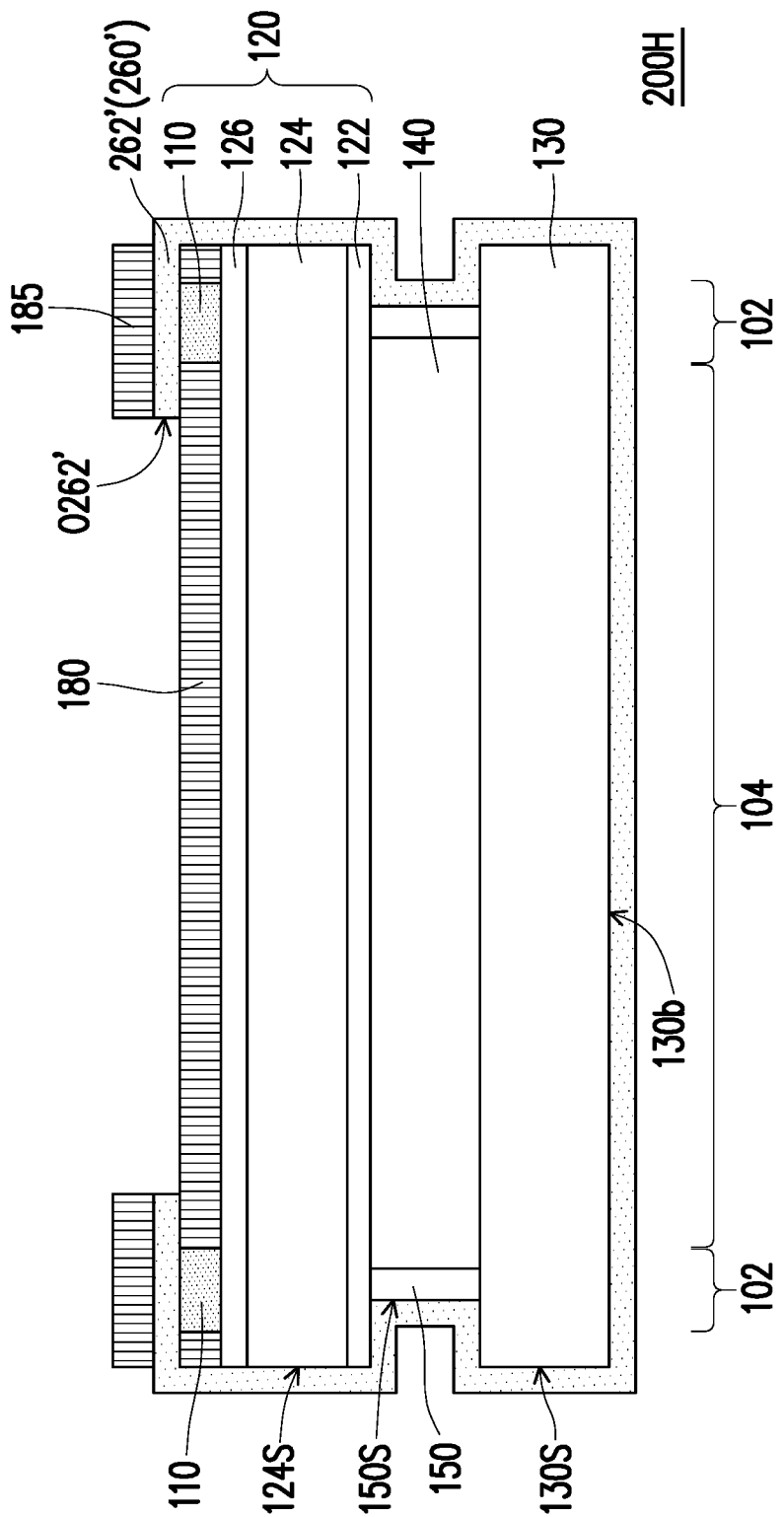

In FIG. 2H is shown a cross section of a display panel according to another embodiment of the present disclosure. The display panel 200H shown in FIG. 2H is similar to the display panel 200G shown in FIG. 2G, and the same or similar reference numbers in the two embodiments represent the same or similar elements or components. The display panel 200H may include at least the top substrate 120 having the patterned light shielding layer 110, the bottom substrate 130, the display medium layer 140, the sealant 150, and the packaging structure 260'. In the display panel 200H of FIG. 2H, the protective layer 262' of the packaging structure 260' differs from the protective layer 262 illustrated in FIG. 2G as the protective layer 262' further covers the outer side surfaces 124S of the support plate 124, the outer side surfaces 150S of the sealant 150, and the outer side surfaces 130S and the bottom surface 130b of the bottom substrate 130.

Figure 3A:
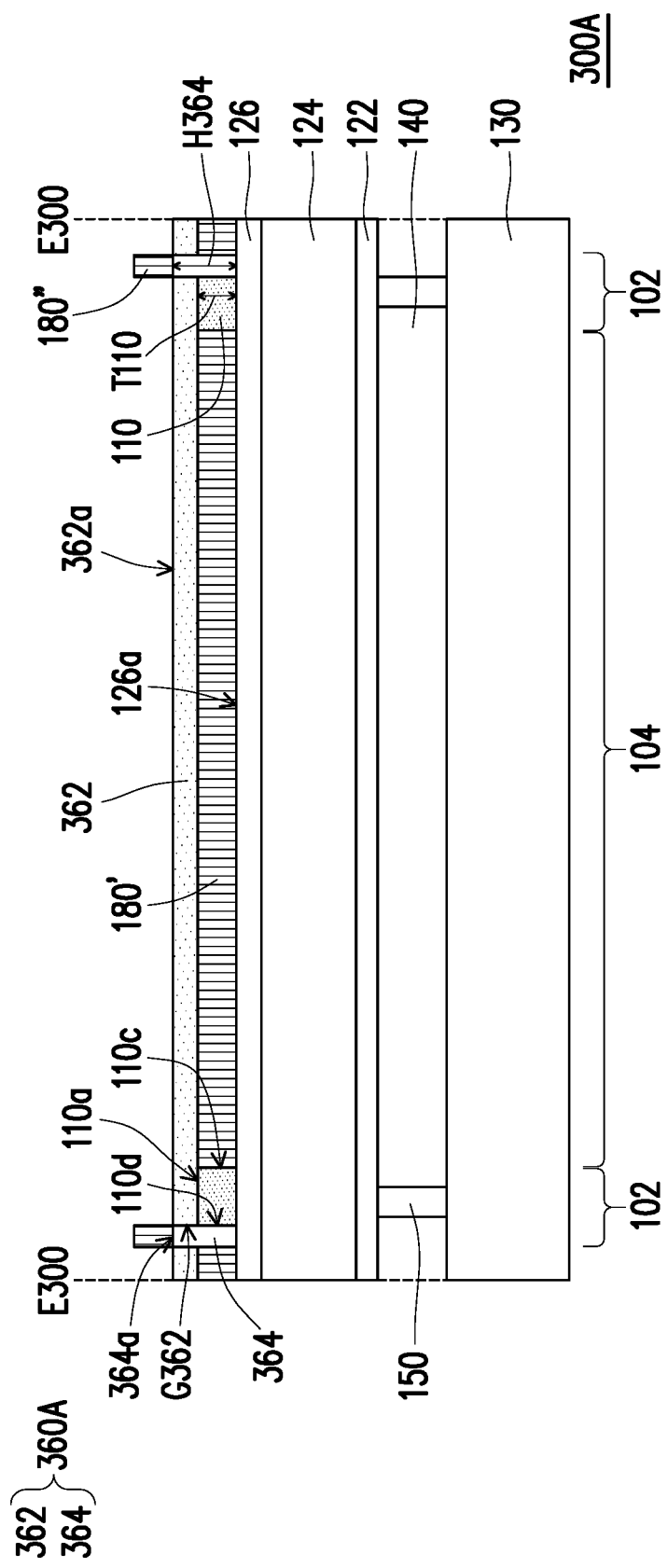
FIGS. 3A-3H show schematic cross sections of respective display panels according to some embodiments of the present disclosure.

In FIG. 3A is shown a cross section of a display panel according to another embodiment of the present disclosure. The display panel 300A shown in FIG. 3A is similar to the display panel 200A shown in FIG. 2A, and the same or similar reference numbers in the two embodiments represent the same or similar elements or components. The display panel 300A may include at least the top substrate 120 having the patterned light shielding layer 110, the bottom substrate 130, the display medium layer 140, the sealant 150, and the packaging structure 360A. The display panel 300A shown in FIG. 3A differs from the display panel 200A shown in FIG. 2A as the packaging structure 360A includes a protective layer 362 and a sidewall pattern 364. The protective layer 362 is disposed on the blanket anti-reflective layer 126 and in contact with the top surface 110a of the patterned light shielding layer 110. The sidewall pattern 364 may be disposed on the blanket anti-reflective layer 126. Specifically, the patterned light shielding layer 110 has an inner edge surface 110c and an outer edge surface 110d, and the sidewall pattern 364 in the embodiment may be arranged along the outer edge surface 110d. The sidewall pattern 364 may be in contact with the outer edge surface 110d of the patterned light shielding layer 110, but the disclosure is not limited thereto.

The sidewall pattern 364 may be made of an inorganic material which may include silicon oxide, titanium oxide, aluminium oxide, or zinc oxide. In some embodiments, the material of the sidewall pattern 364 may be the same as a material of the protective layer 362. In some alternative embodiments, the sidewall pattern 364 and the protective layer 362 may include different materials. The sidewall pattern 364 might offer further protection to the patterned light shielding layer 110 against environmental contaminants and impact forces.

As shown in FIG. 3A, the sidewall pattern 364 is entirely localized between the outer edge surface 110d of the patterned light shielding layer 110 and a side edge E300 of the display panel 300A. In some alternative embodiments, the sidewall pattern 364 may be disposed adjacent to the inner edge surface 110c of the patterned light shielding layer 110, and be entirely within the second region 104. That is, the sidewall pattern 364 may be positioned between the patterned light shielding layer 110 and a portion of the protective layer 362 covering the second region 104 of the display panel. In some other alternative embodiments, the sidewall pattern, for example, may include multiple sidewall portions disposed along the outer edge surface 110d and the inner edge surface 110c of the patterned light shielding layer 110 respectively, but the disclosure is not limited thereto.

In the present embodiment, the sidewall pattern 364 may have a height H364 that is greater than a thickness T110 of the patterned light shielding layer 110. The thickness T110 of the patterned light shielding layer 110 may be measured at either the inner edge surface 110c or at the outer edge surface 110d. That is, the whole edge surface of the patterned light shielding layer 110 (for example, an outer edge surface 110d in the display panel 300A of FIG. 3A) may be covered by the sidewall pattern 364. In some embodiments, the protective layer 362 may be blank where the sidewall pattern 364 is located, and the sidewall pattern 364 may traverse the protective layer 362 in the thickness direction. In other words, the protective layer 362 may include a plurality of gaps G362 that are filled by the sidewall pattern 364, and an upper surface 364a of the sidewall pattern 364 may be revealed. The sidewall pattern 364 may be protruded from the plane of the top surface 110a of the patterned light shielding layer 110 such that a top surface 364a of the sidewall pattern 364 may be coplanar with a top surface 362a of the protective layer 362 in the present embodiment, but the disclosure is not limited thereto.

Furthermore, before forming the patterned light shielding layer 110 in the first region 102, the upper surface 364a of the sidewall pattern 364 and a portion of the upper surface 126a of the blanket anti-reflective layer 126 may be functionalized with some hydrophobic material whilst no hydrophobic material remain on another portion of the upper surface 126a of the blanket anti-reflective layer 126 at the first region 102. Accordingly, the patterned light shielding layer 110 formed by performing an inkjet printing process may have sharp pattern. Specifically, a layer of hydrophobic material 180' and another layer of hydrophobic material 180" may be generated under the functionalization treatment. The layer of hydrophobic material 180" may be located on the upper surface 364a of the sidewall pattern 364 and be non-coplanar with the layer of hydrophobic material 180' that is in direct contact with the blanket anti-reflective layer 126.

Figure 3B:
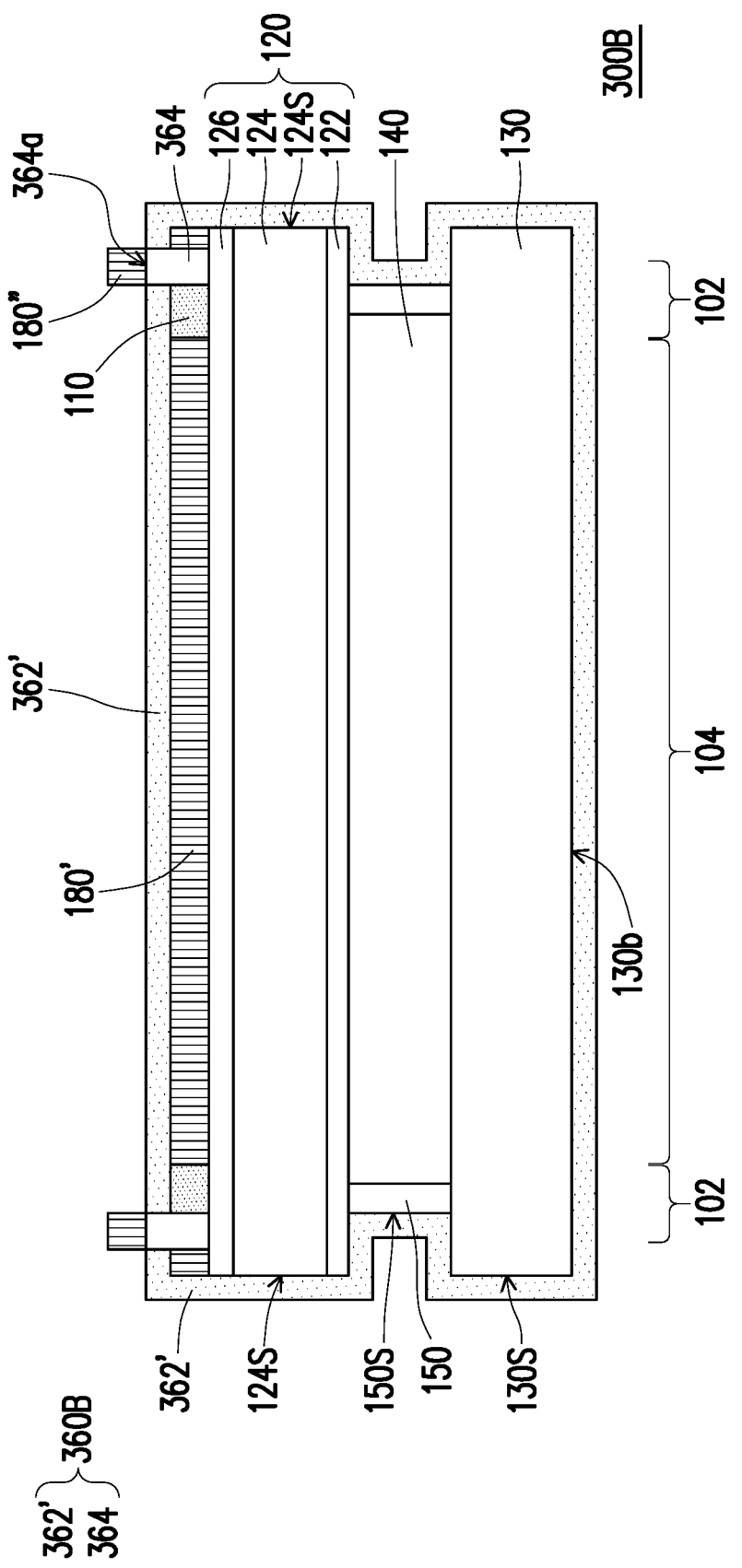

In FIG. 3B is shown a cross section of a display panel according to another embodiment of the present disclosure. The structure of the display panel 300B shown in FIG. 3B may be an implementing example of the display panel 100. The display panel 300B may include at least the top substrate 120 having the patterned light shielding layer 110, the bottom substrate 130, the display medium layer 140, the sealant 150, and the packaging structure 360B. The display panel 300B shown in FIG. 3B is similar to the display panel 300A shown in FIG. 3A, and the same or similar reference numbers in the two embodiments represent the same or similar elements or components. The display panel 300B shown in FIG. 3B differs from the display panel 300A shown in FIG. 3A as the packaging structure 360B includes a protective layer 362' illustrated in FIG. 3B extending around the whole display panel 300B, encasing it. That is, the protective layer 362' may cover the outer side surfaces 124S of the support plate 124, the outer side surfaces 150S of the sealant 150, and the outer side surfaces 130S and the bottom surface 130b of the bottom substrate 130, whilst the protective layer 362' does not cover the upper surface 364a of the sidewall pattern 364.

Figure 3C:
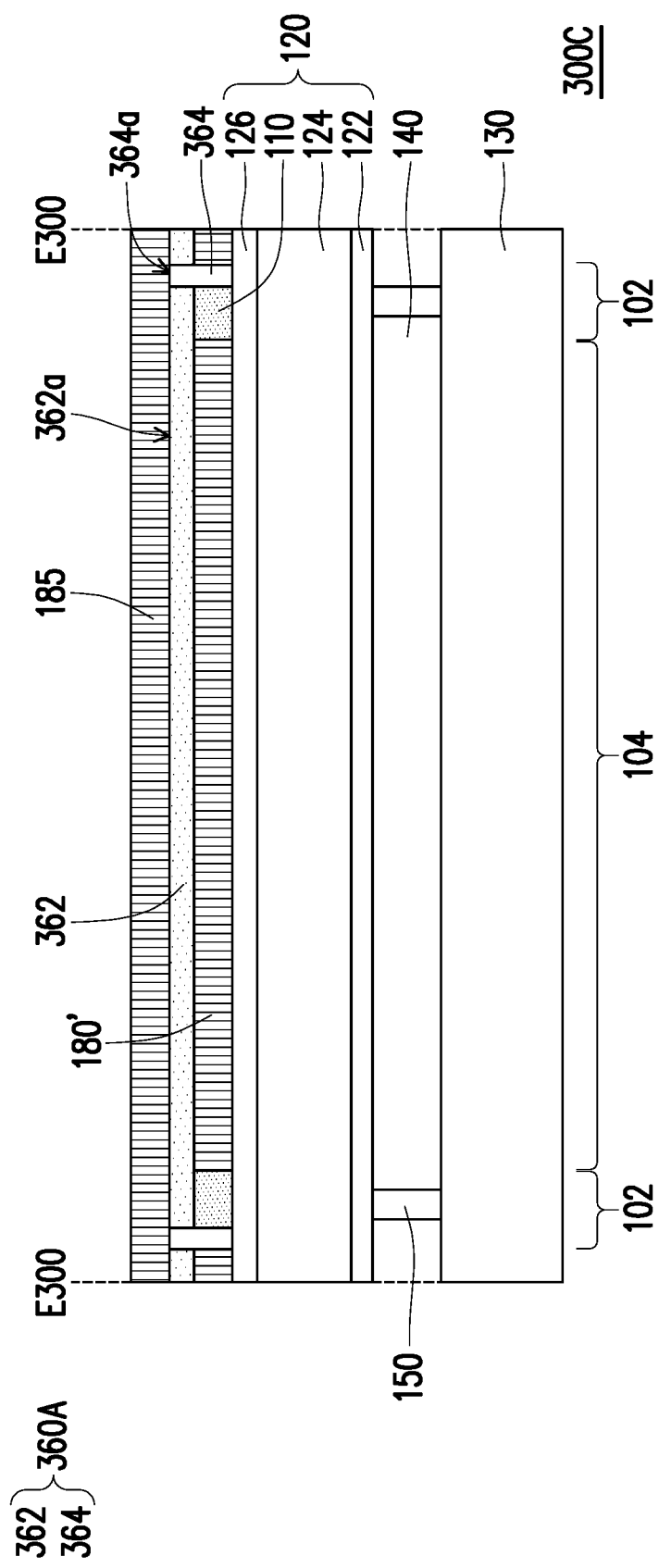

In FIG. 3C is shown a cross section of a display panel according to another embodiment of the present disclosure. The structure of the display panel 300C shown in FIG. 3C may be an implementing example of the display panel 100.

The display panel 300C shown in FIG. 3C is similar to the display panel 300A shown in FIG. 3A, and the same or similar reference numbers in the two embodiments represent the same or similar elements or components. The display panel 300C may include at least the top substrate 120 having the patterned light shielding layer 110, the bottom substrate 130, the display medium layer 140, the sealant 150, the packaging structure 360A and the layer of hydrophobic material 180'. The display panel 300C shown in FIG. 3C differs from the display panel 300A shown in FIG. 3A as an upper surface of the packaging structure 360A may be functionalised with a layer of hydrophobic material 185. In other words, the layer of hydrophobic material 185 may exist on an upper surface 362a of the protective layer 362 and on an upper surface 364a of the sidewall pattern 364. The layer of hydrophobic material 185 may extend uninterrupted within the area circumscribed by a side edge E300 of the display panel 300C. That is, the layer of hydrophobic material 185 may cover the entire first region 102 and second region 104 of the display panel 300C.

Figure 3D:
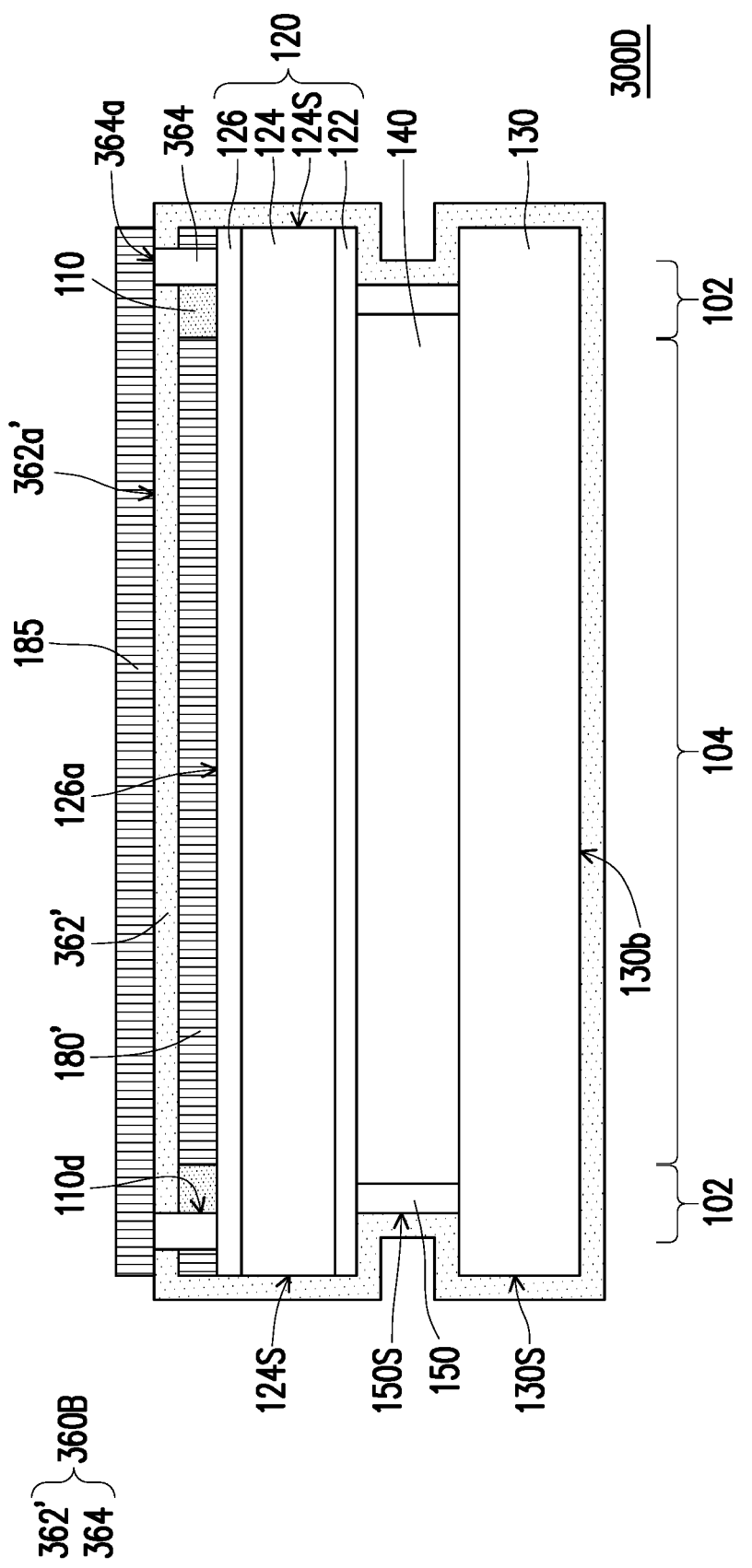

In FIG. 3D is shown a cross section of a display panel according to another embodiment of the present disclosure. The structure of the display panel 300D shown in FIG. 3D may be an implementing example of the display panel 100. The display panel 300D shown in FIG. 3D is similar to the display panel 300C shown in FIG. 3C, and the same or similar reference numbers in the two embodiments represent the same or similar elements or components. The display panel 300D may include at least the top substrate 120 having the patterned light shielding layer 110, the bottom substrate 130, the display medium layer 140, the sealant 150, the packaging structure 360B and the layer of hydrophobic material 180'. In the display panel 300D, the protective layer 362' of the packaging structure 360B may extend around the whole display panel 300D, completely encasing it. That is, the protective layer 362' may cover the outer side surfaces 124S of the support plate 124, the outer side surfaces 150S of the sealant 150, and the outer side surfaces 130S and the bottom surface 130b of the bottom substrate 130 whilst the protective layer 362' does not cover the upper surface 364a of the sidewall pattern 364. In the present embodiment, the layer of hydrophobic material 185 may extend only on a portion of an upper surface 362a' of the protective layer 362' that runs parallel to the upper surface 126a of the blanket anti-reflective layer 126 and that contacts directly either the layer of hydrophobic material 180' or the patterned light shielding layer 110. The layer of hydrophobic material 185 may further extend on an upper surface 364a of the sidewall pattern 364. The layer of hydrophobic material 185 may not extend all over the display panel 300D as the protective layer 162 does, but the disclosure is not limited thereto. In some alternative embodiments, the layer of hydrophobic material 185 may extend over the entire outer surface of the packaging structure 360B, encasing the display panel 300D in a similar fashion as the protective layer 362' does.

Figure 3E:
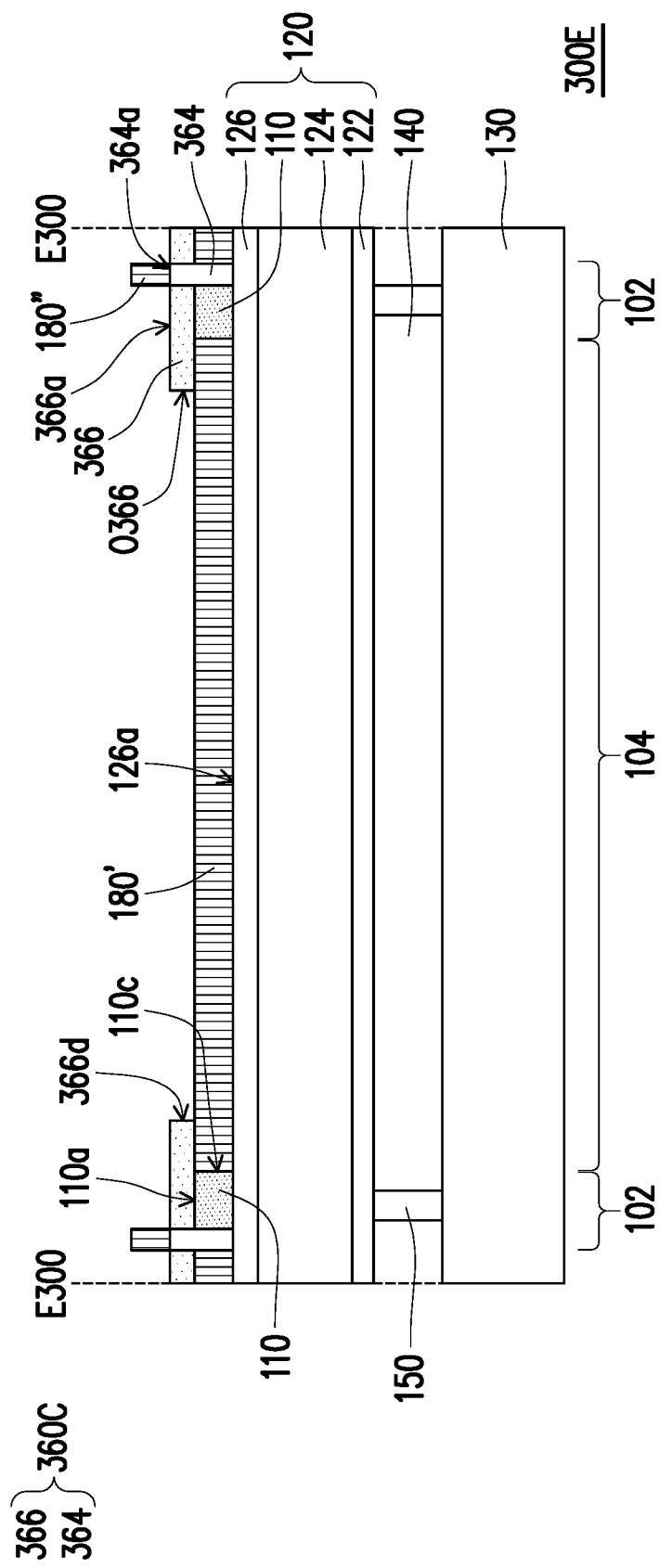

In FIG. 3E is shown a cross section of a display panel according to another embodiment of the present disclosure. The structure of the display panel 300E shown in FIG. 3E may be an implementing example of the display panel 100. The display panel 300E shown in FIG. 3E is similar to the display panel 300A shown in FIG. 3A and the same or similar reference numbers in the two embodiments represent the same or similar elements or components. The display panel 300E may include at least the top substrate 120 having the patterned light shielding layer 110, the bottom substrate 130, the display medium layer 140, the sealant 150, the packaging structure 360C, and the layers of hydrophobic material 180' and 180". The display panel 300E shown in FIG. 3E differs from the display panel 300A shown in FIG. 3A as a packaging structure 360C includes a protective layer 366 and the sidewall pattern 364, and the protective layer 366 may not extend over the entire second region 104 of the display panel 300E. An opening O366 may exist in the protective layer 366 that may reveal at least a portion of the second region 104 of the display panel 300E. In the embodiments where the opening O366 of the protective layer 366 is present, the exposed portion of the second region 104 by the protective layer 366 may serve as a display region. Namely, the area surrounded by the opening O366 of the protective layer 366 may be considered as the area presenting the displayed image. The opening O366 of the protective layer 366 may expose a portion of the layer of hydrophobic material 180' on an upper surface 126a of the blanket anti-reflective layer 126 in the second region 104 of the display panel 300E. That is, the protective layer 366 might cover only a part of the layer of hydrophobic material 180' distributed in the second region 104 of the display panel 300E, rather than the entirety of the layer of hydrophobic material 180' as it happens in the top substrate 300A.

The protective layer 366 may be disposed on top of the patterned light shielding layer 110, and may laterally extend toward the side edge E300 of the display panel 300E, and toward the second region 104 of the display panel 300E. The protective layer 366 may extend from the top surface 110a of the patterned light shielding layer 110 toward the second region 104 for about 200 μm to 1000 μm. In other words, there is a portion of the second region 104 extending between an inner edge surface 110c of the patterned light shielding layer 110 and an inner side surface 366d of the protective layer 366 that is covered by the protective layer 366 and is not served as the display region. Rather, a boundary of the display region may be defined by the inner side surface 366d of the protective layer 366.

Figure 3F:
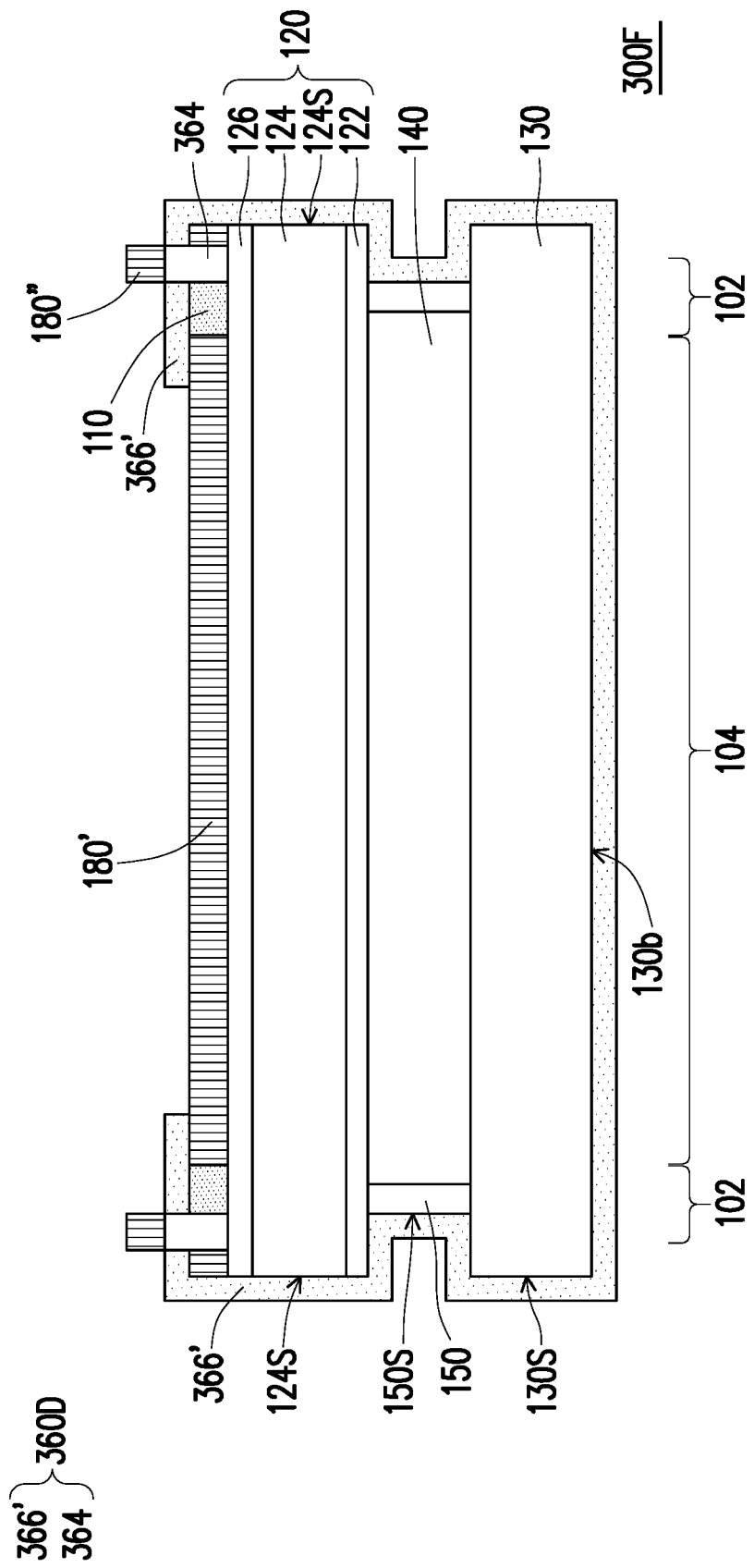

In FIG. 3F is shown a cross section of a display panel according to another embodiment of the present disclosure. The structure of the display panel 300F shown in FIG. 3F may be an implementing example of the display panel 100. The display panel 300F shown in FIG. 3F is similar to the display panel 300E shown in FIG. 3E, and the same or similar reference numbers in the two embodiments represent the same or similar elements or components. The display panel 300F may include at least the top substrate 120 having the patterned light shielding layer 110, the bottom substrate 130, the display medium layer 140, the sealant 150, the packaging structure 360D and the layers of hydrophobic material 180' and 180". In the display panel 300F, the packaging structure 360D includes a protective layer 366' and the sidewall pattern 364 and the protective layer 366' may extend around a display panel 300F. That is, a protective layer 366' may cover the outer side surfaces 124S of the support plate 124, the outer side surfaces 150S of a sealant 150, and the outer side surfaces 130S and the bottom surface 130b of the bottom substrate 130.

Figure 3G:
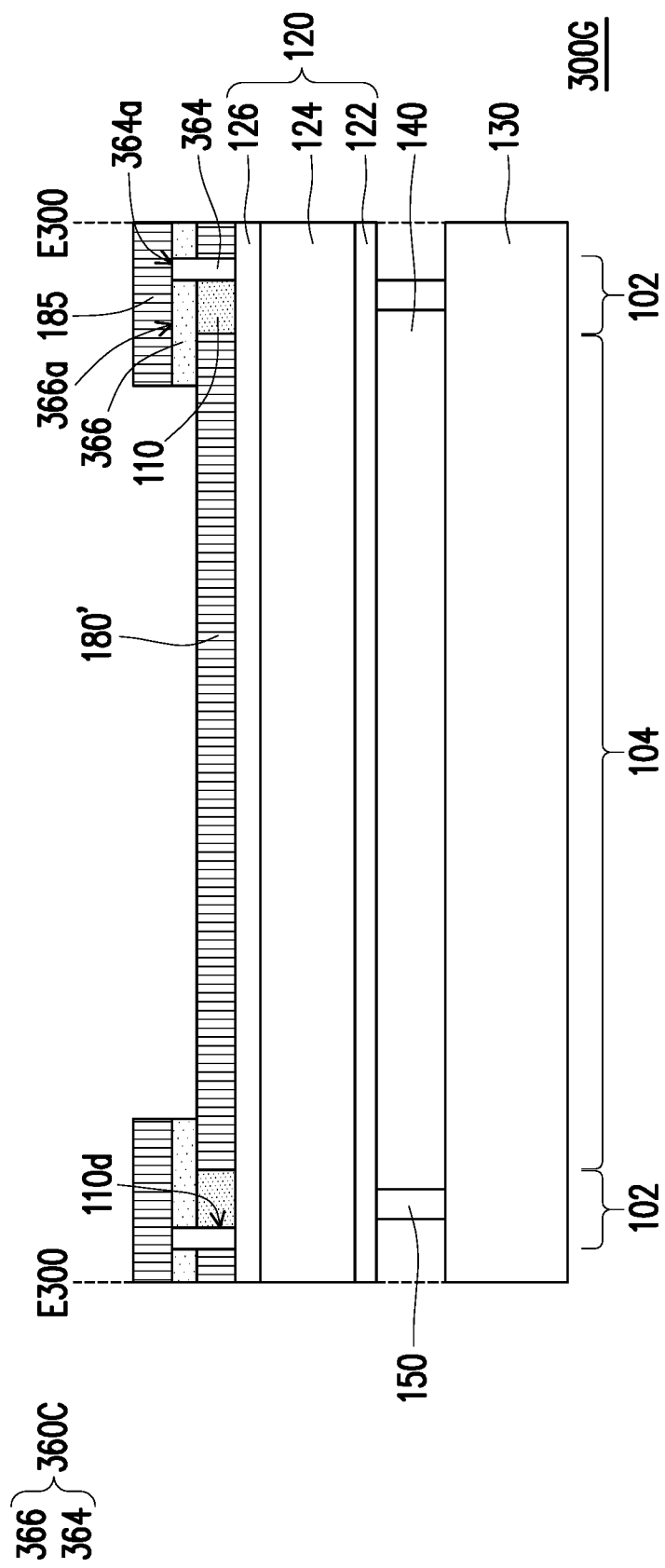

In FIG. 3G is shown a cross section of a display panel according to another embodiment of the present disclosure. The structure of the display panel 300G shown in FIG. 3G may be an implementing example of the display panel 100. The display panel 300G shown in FIG. 3G is similar to the display panel 300E shown in FIG. 3E and the same or similar reference numbers in the two embodiments represent the same or similar elements or components. The display panel 300G may include at least the top substrate 120 having the patterned light shielding layer 110, the bottom substrate 130, the display medium layer 140, the sealant 150, the packaging structure 360C and the layer of hydrophobic material 180'. The display panel 300G shown in FIG. 3G differs from the display panel 300E shown in FIG. 3E as a layer of hydrophobic material 185 may be disposed on an upper surface 366a of the protective layer 366 and on the upper surface 364a of the sidewall pattern 364.

Figure 3H:
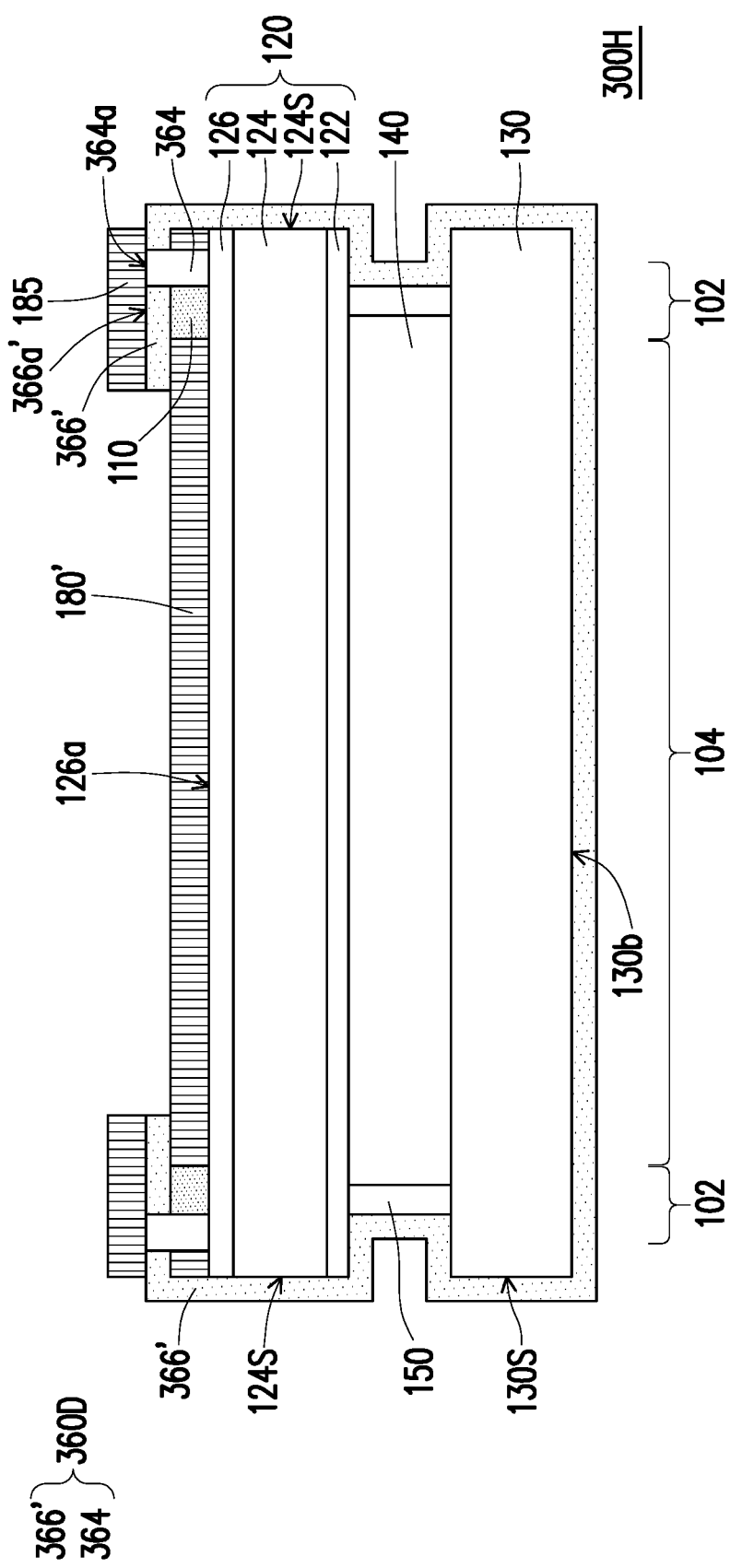

In FIG. 3H is shown a cross section of a display panel according to another embodiment of the present disclosure. The structure of the display panel 300H shown in FIG. 3H may be an implementing example of the display panel 100. The display panel 300H shown in FIG. 3H is similar to the display panel 300G shown in FIG. 3G, and the same or similar reference numbers in the two embodiments represent the same or similar elements or components. The display panel 300H may include at least the top substrate 120 having the patterned light shielding layer 110, the bottom substrate 130, the display medium layer 140, the sealant 150, the packaging structure 360D and the layers of hydrophobic material 180' and 185. In the display panel 300H, the protective layer 366' of the packaging structure 360D may extend around the display panel 300H. That is, the protective layer 366' may cover the outer side surfaces 124S of the support plate 124, the outer side surfaces 150S of the sealant 150, and the outer side surfaces 130S and the bottom surface 130b of the bottom substrate 130. In addition, the layer of hydrophobic material 185 may be disposed on an upper surface 366a' of the protective layer 366' and on the upper surface 364a of the sidewall pattern 364.

Figure 4A:
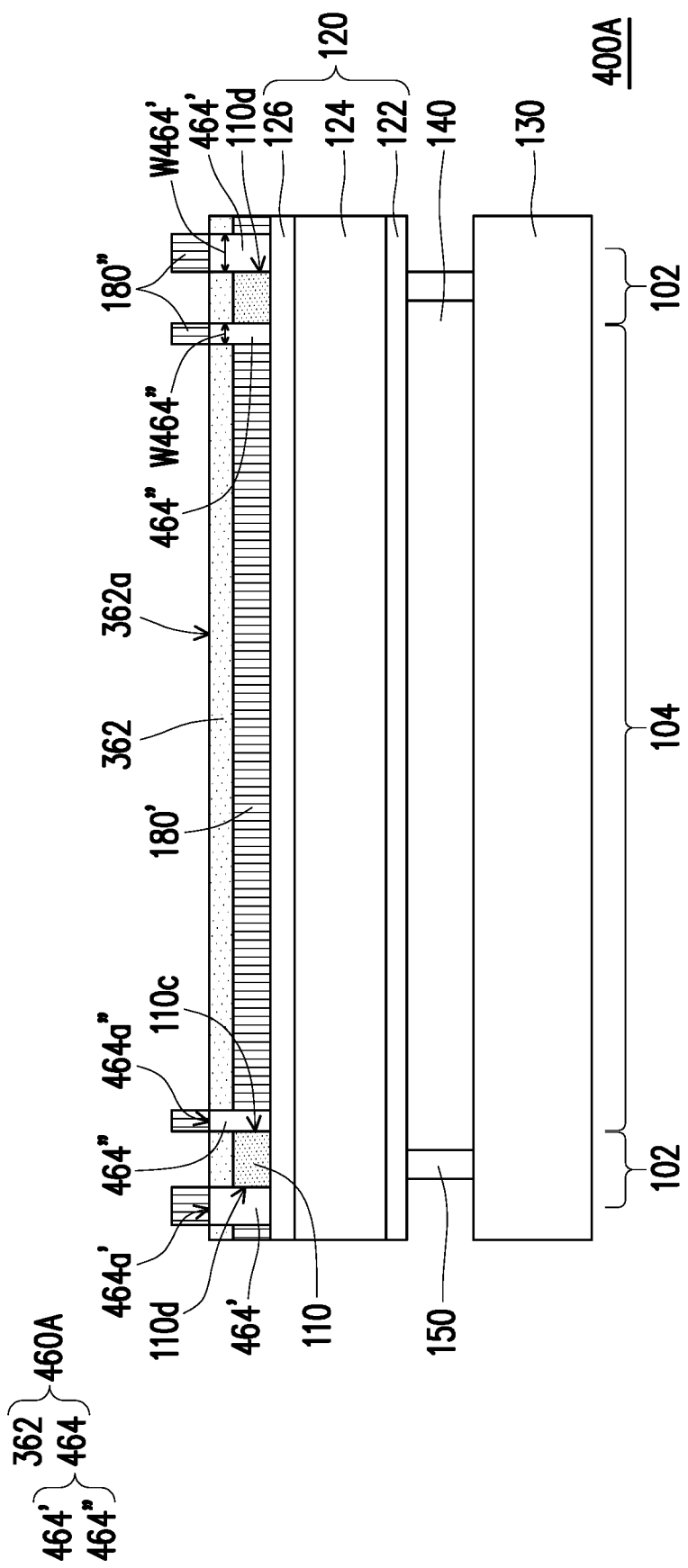
FIGS. 4A-4H show schematic cross sections of respective display panels according to some embodiments of the present disclosure.

In FIG. 4A is shown a cross section of a display panel according to another embodiment of the present disclosure. The structure of the display panel 400A shown in FIG. 4A may be an implementing example of the display panel 100. The display panel 400A shown in FIG. 4A is similar to the display panel 300A shown in FIG. 3A, and the same or similar reference numbers in the two embodiments represent the same or similar elements or components. The display panel 400A may include at least the top substrate 120 having the patterned light shielding layer 110, the bottom substrate 130, the display medium layer 140, the sealant 150, the packaging structure 460A and the layers of hydrophobic material 180' and 180". The display panel 400A shown in FIG. 4A differs from the display panel 300A shown in FIG. 3A as the packaging structure 460A includes the protective layer 362 and a sidewall pattern 464 including an outer sidewall portion 464' adjacent to an outer edge surface 110d of a patterned light shielding layer 110, and an inner sidewall portion 464" adjacent to an inner edge surface 110c of the patterned light shielding layer 110 opposite to the outer edge surface 110d. Both sidewalls portions 464' and 464" of the sidewall pattern 464 may be in direct contact with the patterned light shielding layer 110. In some alternative embodiments, only a single sidewall portion of the sidewall pattern might be in direct contact with the patterned light shielding layer, and in a yet alternative embodiment, the sidewall pattern might not be in direct contact with the patterned light shielding layer 110.

The individual sidewalls portions 464' and 464" of the sidewall pattern 464 may present different lateral widths. In an embodiment, the outer sidewall portion 464' may have a lateral width W464' that is greater than a lateral width W464" of the inner sidewall portion 464", but the disclosure is not limited thereto. In an alternative embodiment, it might be a lateral width W464" of the inner sidewall portion 464" to be greater than a lateral width W464' of the outer sidewall portion 464'. In a yet different embodiment, the individual sidewall patterns of the sidewall pattern 464 might present equal lateral widths, that is, a lateral width W464' of the outer sidewall pattern 464' might be equal to a lateral width W464" of the inner sidewall pattern 464".

The sidewall pattern 464 may traverse the protective layer 362. In other words, the protective layer 362 may not over the upper surface 464a' of the sidewall portion 464' and the upper surface 464a" of the sidewall portion 464". The upper surface 464a' of the sidewall portion 464' and the upper surface 464a" of the sidewall portion 464" may be coplanar with an upper surface 362a of the protective layer 362.

Furthermore, the blanket anti-reflective layer 126, the sidewall portion 464' and the sidewall portion 464" may be functionalized with some hydrophobic materials. That is, a layer of hydrophobic material 180' may be located on the blanket anti-reflective layer 126 and another layer of hydrophobic material 180" may be located on the sidewall portion 464' and the sidewall portion 464" whilst the layer of hydrophobic material 180" may be non-coplanar with the layer of hydrophobic material 180' disposed in contact with the blanket anti-reflective layer 126.

Figure 4B:
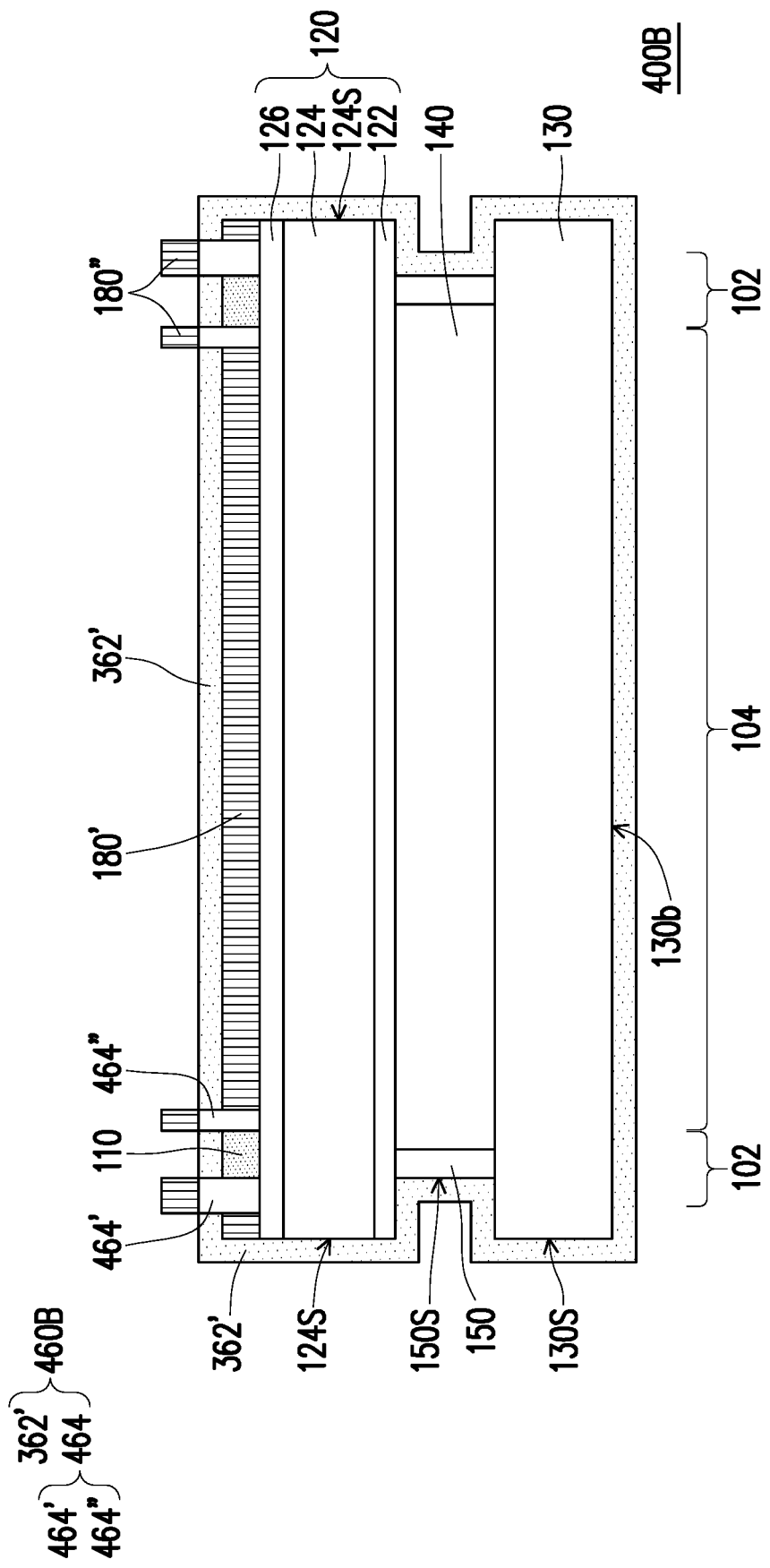

In FIG. 4B is shown a cross section of a display panel according to another embodiment of the present disclosure. The structure of the display panel 400B shown in FIG. 4B may be an implementing example of the display panel 100. The display panel 400B shown in FIG. 4B is similar to the display panel 400A shown in FIG. 4A, and the same or similar reference numbers in the two embodiments represent the same or similar elements or components. The display panel 400B may include at least the top substrate 120 having the patterned light shielding layer 110, the bottom substrate 130, the display medium layer 140, the sealant 150, the packaging structure 460B and the layers of hydrophobic material 180' and 180". The display panel 400B shown in FIG. 4B differs from the display panel 400A shown in FIG. 4A as the packaging structure 460B includes the protective layer 362' and the sidewall pattern 464, and the protective layer 362' may extend around the whole display panel 400B, encasing it. That is, the protective layer 362' may cover the outer side surfaces 124S of the support plate 124, the outer side surfaces 150S of the sealant 150 and the outer side surfaces 130S and the bottom surface 130b of the bottom substrate 130.

Figure 4C:
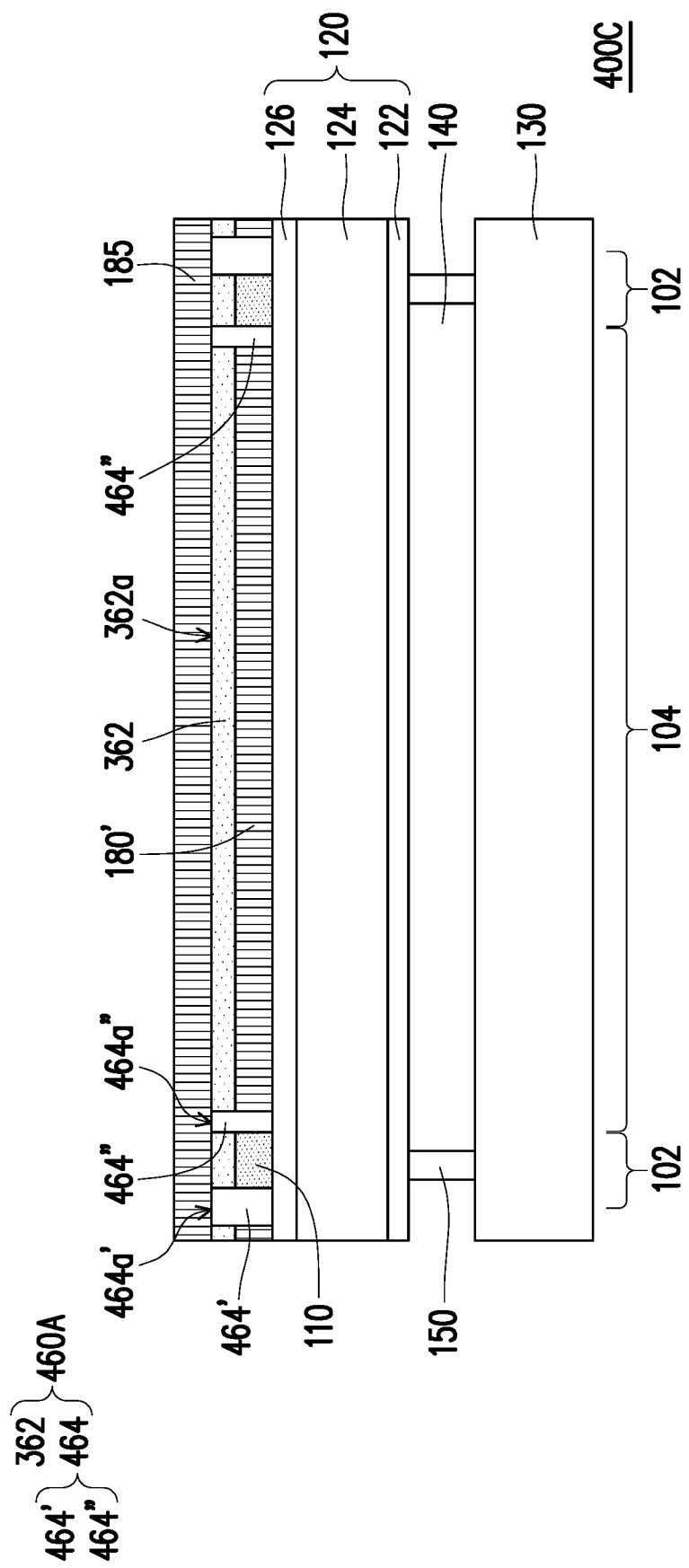

In FIG. 4C is shown a cross section of a display panel according to another embodiment of the present disclosure. The structure of the display panel 400C shown in FIG. 4C may be an implementing example of the display panel 100. The display panel 400C shown in FIG. 4C is similar to the display panel 400A shown in FIG. 4A, and the same or similar reference numbers in the two embodiments represent the same or similar elements or components. The display panel 400C may include at least the top substrate 120 having the patterned light shielding layer 110, the bottom substrate 130, the display medium layer 140, the sealant 150, the packaging structure 460A and the layer of hydrophobic material 180'. The display panel 400C shown in FIG. 4C differs from the display panel 400A shown in FIG. 4A as an entire upper surface of a packaging structure 460A may be functionalised with a layer of hydrophobic material 185. In other words, the layer of hydrophobic material 185 may exist on an upper surface 362a of a protective layer 362, the upper surface 464a' of the sidewall portion 464' and the upper surface 464a" of the sidewall portion 464". The layer of hydrophobic material 185 may extend uninterrupted within the area circumscribed by a side edge of the display panel 400C.

Figure 4D:
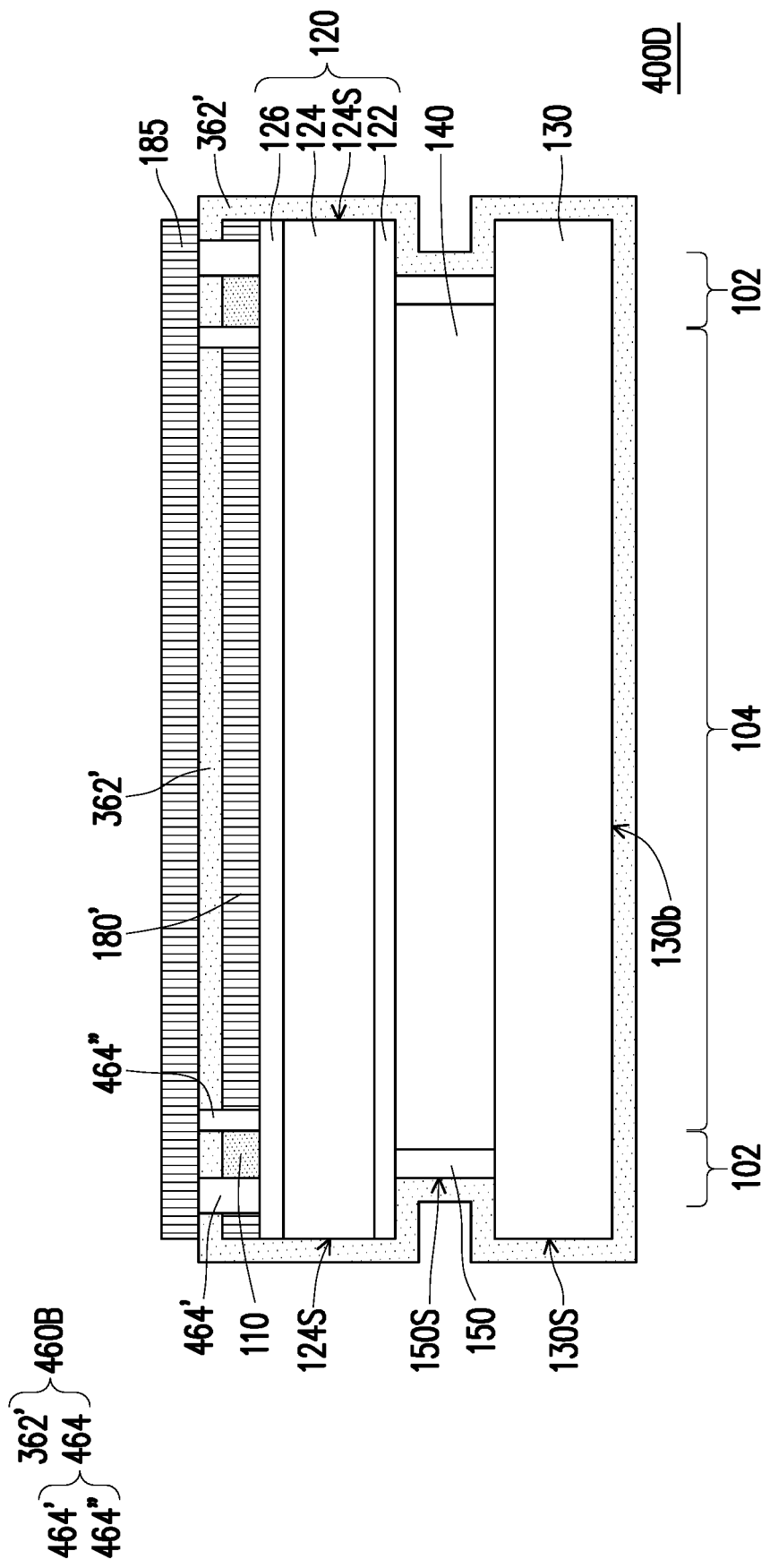

In FIG. 4D is shown a cross section of a display panel according to another embodiment of the present disclosure. The structure of the display panel 400D shown in FIG. 4D may be an implementing example of the display panel 100. The display panel 400D shown in FIG. 4D is similar to the display panel 400C shown in FIG. 4C, and the same or similar reference numbers in the two embodiments represent the same or similar elements or components. The display panel 400D may include at least the top substrate 120 having the patterned light shielding layer 110, the bottom substrate 130, the display medium layer 140, the sealant 150, the packaging structure 460B and the layer of hydrophobic material 180'. In the display panel 400D, a protective layer 362' of the packaging structure 460B may extend around the whole display cell (the top substrate 120, the bottom substrate 130, and the display medium layer 140, the sealant 150), completely encasing it. That is, the protective layer 362' may cover the outer side surfaces 124S of the support plate 124, the outer side surfaces 150S of the sealant 150, and the outer side surfaces 130S and the bottom surface 130b of the bottom substrate 130. In the present embodiment, the layer of hydrophobic material 185 may extend only on a portion of the protective layer 362' that runs parallel to the upper surface of the blanket anti-reflective layer 126. The layer of hydrophobic material 185 may further extend on top of the sidewall pattern 464. That is, the layer of hydrophobic material 185 may not run all over the display panel 400D as the protective layer 362' does. In some alternative embodiment, the layer of hydrophobic material 185 may extend over the entire outer surface of the packaging structure 460B, encasing the display panel in a similar fashion as the protective layer 362' does.

Figure 4E:
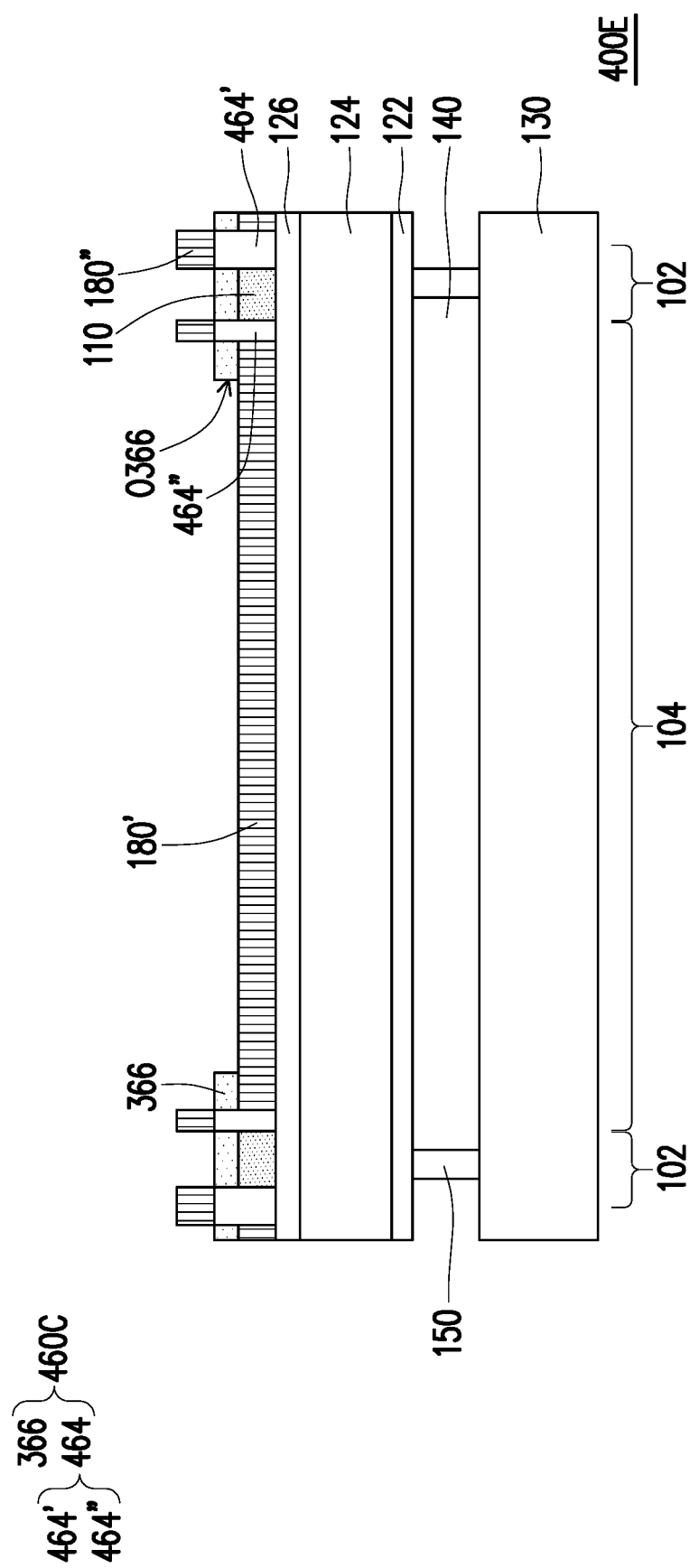

In FIG. 4E is shown a cross section of a display panel according to another embodiment of the present disclosure. The structure of the display panel 400E shown in FIG. 4E may be an implementing example of the display panel 100. The display panel 400E shown in FIG. 4E is similar to the display panel 400A shown in FIG. 4A and the same or similar reference numbers in the two embodiments represent the same or similar elements or components. The display panel 400E may include at least the top substrate 120 having the patterned light shielding layer 110, the bottom substrate 130, the display medium layer 140, the sealant 150, the packaging structure 460C and the layers of hydrophobic material 180' and 180". The display panel 400E shown in FIG. 4E differs from the display panel 400A shown in FIG. 4A as the packaging structure 460C includes the protective layer 366 and the sidewall pattern 464, and the protective layer 366 may not extend over the entire second region 104 of the display panel 400E. An opening O366 may exist in the protective layer 366 that may cover a portion of the second region 104 of the display panel 400E. In the embodiments where the opening O366 of the protective layer 366 is present, the exposed portion of the second region 104 may serve as a display region. Namely, the area surrounded by the opening O366 of the protective layer 366 may be considered as the area presenting the displayed image. The opening O366 in the protective layer 366 may expose a portion of the layer of hydrophobic material 180' on the blanket anti-reflective layer 126 in the second region 104 of the display panel 400E.

Figure 4F:
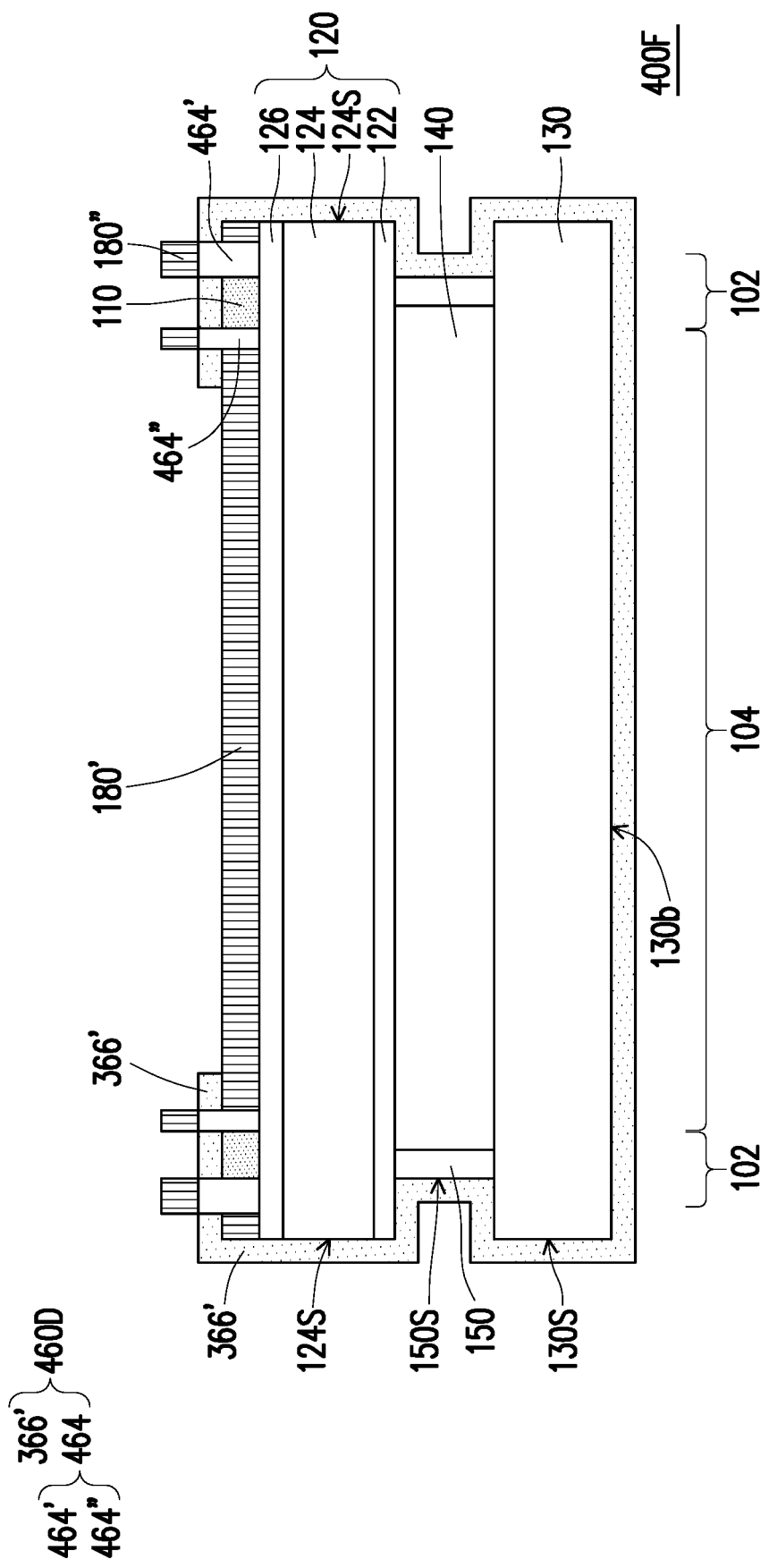

In FIG. 4F is shown a cross section of a display panel according to another embodiment of the present disclosure. The structure of the display panel 400F shown in FIG. 4F may be an implementing example of the display panel 100. The display panel 400F shown in FIG. 4F is similar to the display panel 400E shown in FIG. 4E, and the same or similar reference numbers in the two embodiments represent the same or similar elements or components. The display panel 400F may include at least the top substrate 120 having the patterned light shielding layer 110, the bottom substrate 130, the display medium layer 140, the sealant 150, the packaging structure 460D and the layers of hydrophobic material 180' and 180". In the display panel 400F, the protective layer 366' of the packaging structure 460D may extend around the display panel 400F. That is, the protective layer 366' may cover the outer side surfaces 124S of the support plate 124, the outer side surfaces 150S of the sealant 150, and the outer side surfaces 130S and the bottom surface 130b of the bottom substrate 130.

Figure 4G:
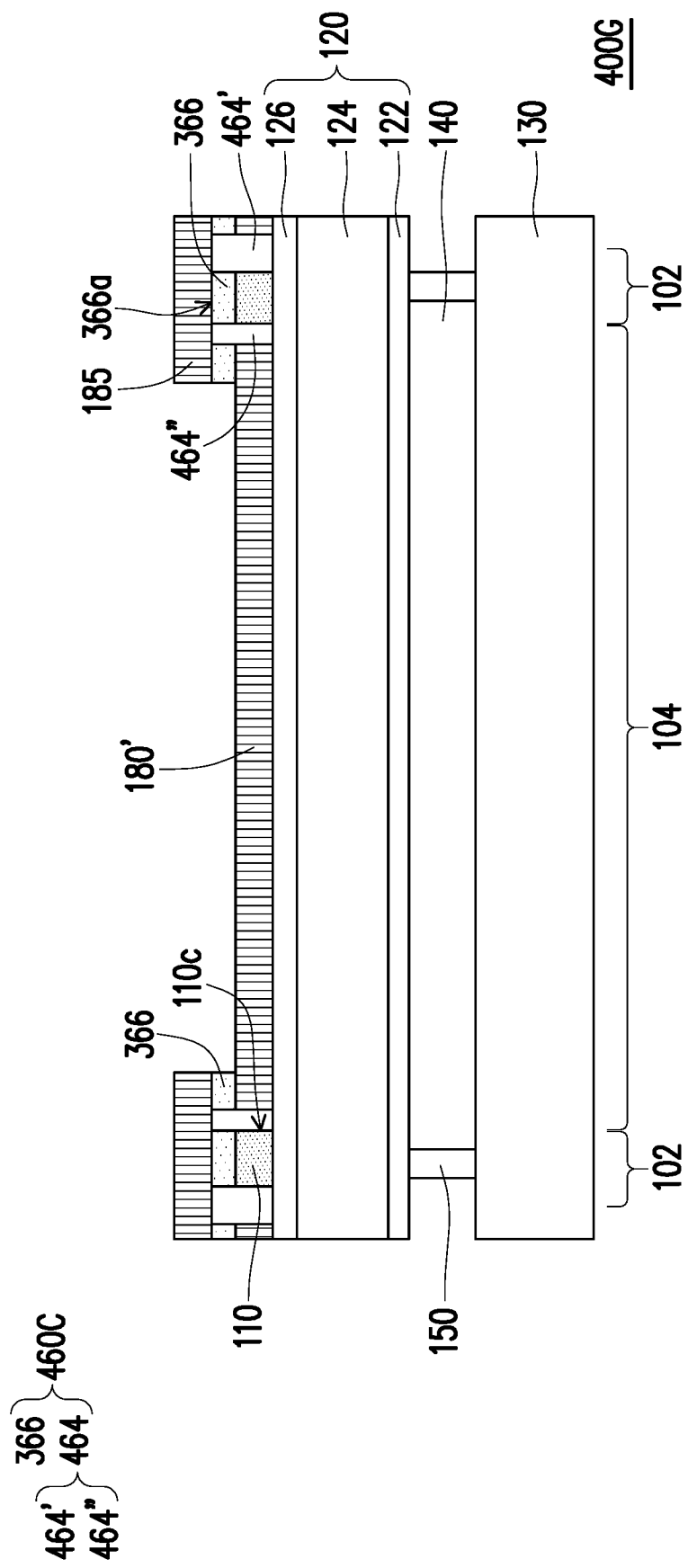

In FIG. 4G is shown a cross section of a display panel according to another embodiment of the present disclosure. The structure of the display panel 400G shown in FIG. 4G may be an implementing example of the display panel 100. The display panel 400G shown in FIG. 4G is similar to the display panel 400E shown in FIG. 4E and the same or similar reference numbers in the two embodiments represent the same or similar elements or components. The display panel 400G may include at least the top substrate 120 having the patterned light shielding layer 110, the bottom substrate 130, the display medium layer 140, the sealant 150, the packaging structure 460C and the layer of hydrophobic material 180'. The display panel 400G shown in FIG. 4G differs from the display panel 400E shown in FIG. 4E as a layer of hydrophobic material 185 may be disposed on an upper surface 366a of the protective layer 366 and on top of the sidewall pattern 464.

Figure 4H:
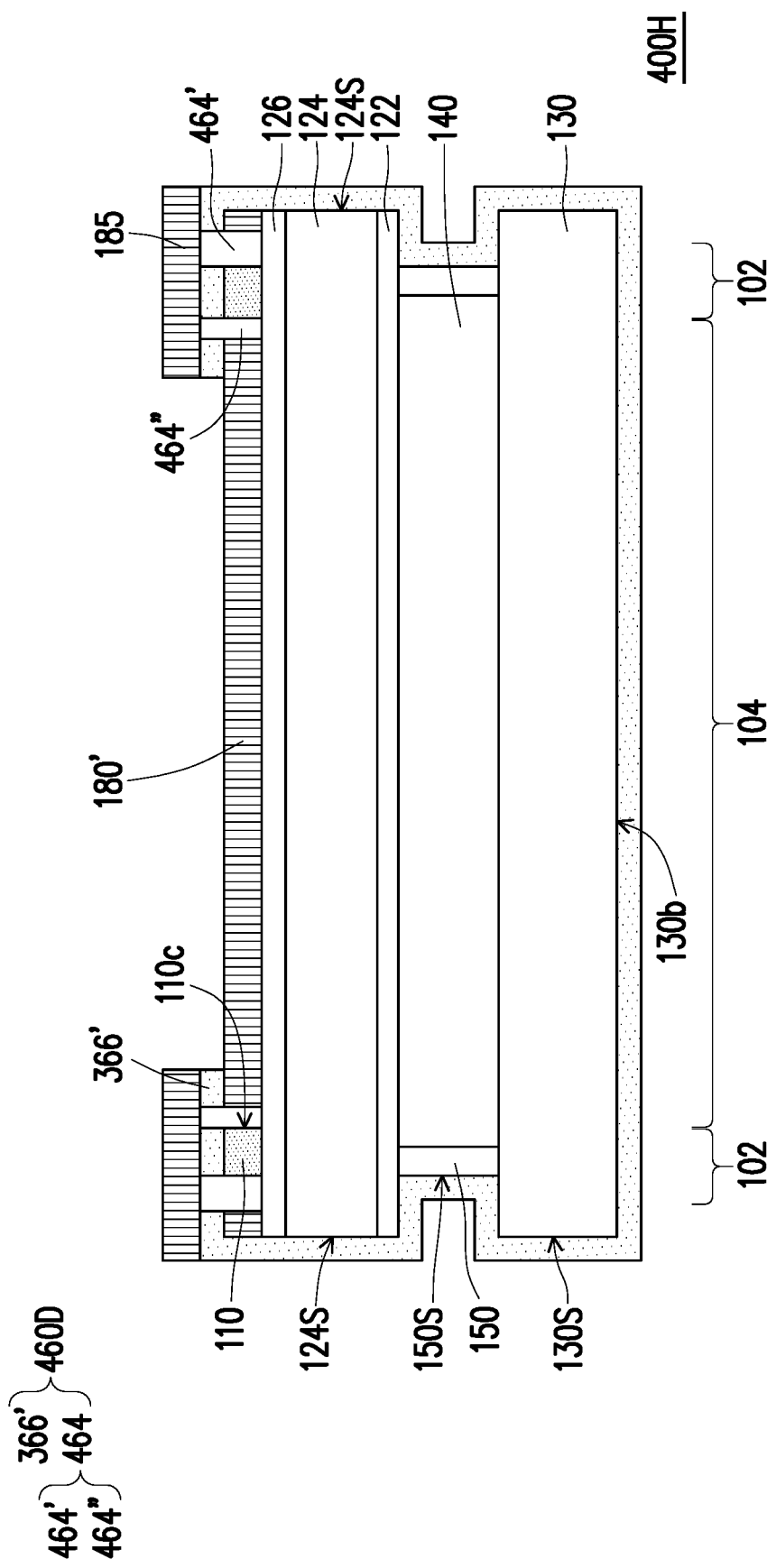

In FIG. 4H is shown a cross section of a display panel according to another embodiment of the present disclosure. The structure of the display panel 400H shown in FIG. 4H may be an implementing example of the display panel 100. The display panel 400H shown in FIG. 4H is similar to the display panel 400G shown in FIG. 4G, and the same or similar reference numbers in the two embodiments represent the same or similar elements or components. The display panel 400H may include at least the top substrate 120 having the patterned light shielding layer 110, the bottom substrate 130, the display medium layer 140, the sealant 150, the packaging structure 460D and the layer of hydrophobic material 180'. In the display panel 400H, the protective layer 366' of the packaging structure 460D may extend around the display panel 400H. That is, the protective layer 366' may cover the outer side surfaces 124S of the support plate 124, the outer side surfaces 150S of the sealant 150, and the outer side surfaces 130S and the bottom surface 130b of the bottom substrate 130.

In light of the foregoing, the display panel according to an embodiment of the disclosure includes a patterned light shielding layer and a packaging structure in contact with the patterned light shielding layer. The packaging structure may include a protective layer covering a top surface of the patterned light shielding layer. The packaging structure may further include a sidewall pattern facing at least one edge surface of the patterned light shielding layer. Accordingly, the packaging structure may protect the patterned light shielding layer against damages induced by environmental contaminants or impact forces.

It will be apparent to those skilled in the art that various modifications and variations can be made to the structure of the present invention without departing from the scope or spirit of the invention. In view of the foregoing, it is intended that the present invention covers modifications and variations of this invention, provided these falls within the scope of the following claims and their equivalents.

What is claimed is:

1. A display panel, having a first region and a second region surrounded by the first region, the display panel comprising:
   a top substrate, comprising:
      a support plate;
      a blanket anti-reflective layer, disposed on an upper surface of the support plate; and
      a patterned light shielding layer disposed on the support plate and located within the first region of the display panel, wherein the patterned light shielding layer is in physical contact with an upper surface of the blanket anti-reflective layer, and a whole of the patterned light shielding layer is located within an area of the blanket anti-reflective layer;
      a packaging structure packing the patterned light shielding layer;
   a bottom substrate opposite to the top substrate;
   a display medium layer disposed between the top substrate and the bottom substrate; and
   a sealant, disposed between the top substrate and the bottom substrate, wherein the sealant is located in the first region of the display panel and surrounds the display medium layer,
   wherein the packaging structure comprises a protective layer in physical contact with a top surface of the patterned light shielding layer, and the protective layer further completely covers the upper surface of the blanket anti-reflective layer the second region,
   wherein the patterned light shielding layer has an inner edge surface and an outer edge surface, the inner edge surface defines a boundary between the first region and the second region, the outer edge surface is opposite to the inner edge surface, the packaging structure further comprises a sidewall pattern arranged along at least one of the inner edge surface of the patterned light shielding layer and the outer edge surface of the patterned light shielding layer, and the sidewall pattern is independent from the patterned light shielding layer,
   wherein the sidewall pattern comprises an outer sidewall pattern in physical contact with the outer edge surface of the patterned light shielding layer and an inner sidewall pattern in physical contact with the inner edge surface of the patterned light shielding layer, and the outer sidewall pattern and the inner sidewall pattern are spaced apart from each other.

2. The display panel of claim 1, wherein the protective layer extends from the top surface of the patterned light shielding layer toward the second region and has an opening revealing at least a portion of the second region of the display panel.

3. The display panel of claim 1, wherein a material of the protective layer comprises an inorganic material.

4. The display panel of claim 1, wherein the sidewall pattern is in contact with at least one of the inner edge surface of the patterned light shielding layer and the outer edge surface of the patterned light shielding layer.

5. The display panel of claim 4, wherein a height of the sidewall pattern is not less than a thickness of the patterned light shielding layer at the at least one of the inner edge surface and the outer edge surface.

6. The display panel of claim 4, wherein the protective layer reveals a top surface of the sidewall pattern.

7. The display panel of claim 4, wherein a material of the sidewall pattern comprises an inorganic material.

8. The display panel of claim 4, wherein the protective layer comprises a portion disposed on the blanket anti-reflective layer in the second region and the sidewall pattern is positioned between the patterned light shielding layer and the portion of the protective layer.

9. The display panel of claim 1, wherein an upper surface of the packaging structure is modified, and a layer of hydrophobic material is formed thereon.

10. The display panel of claim 1, wherein the upper surface of the blanket anti-reflective layer in the second region is modified, and a layer of hydrophobic material is formed thereon.

11. A display panel, having a first region and a second region surrounded by the first region, the display panel comprising:
    a top substrate, comprising:
       a support plate;
       a blanket anti-reflective layer, disposed on the support plate; and
       a patterned light shielding layer disposed on the blanket anti-reflective layer and located within the first region of the display panel, wherein a whole of the patterned light shielding layer is located within an area of the blanket anti-reflective layer, wherein the patterned light shielding layer has an inner edge surface and an outer edge surface, the inner edge surface defines a boundary between the first region and the second region of the display panel, and the outer edge surface is opposite to the inner edge surface;
       a sidewall pattern arranged along at least one of the inner edge surface and the outer edge surface of the patterned light shielding layer, and the sidewall pattern is independent from the patterned light shielding layer;
    a bottom substrate opposite to the top substrate; and
    a display medium layer disposed between the top substrate and the bottom substrate,
    wherein a height of the sidewall pattern is different from that of the patterned light shielding layer,
    wherein the sidewall pattern comprises an outer sidewall pattern in physical contact with the outer edge surface of the patterned light shielding layer and an inner sidewall pattern in physical contact with the inner edge surface of the patterned light shielding layer, the outer sidewall pattern and the inner sidewall pattern are spaced apart from each other, and a height of the inner sidewall pattern and a height of the outer sidewall pattern are greater than that of the patterned light shielding layer.

12. The display panel of claim 11, wherein a lateral width of the outer sidewall pattern is greater than a lateral width of the inner sidewall pattern.

13. The display panel of claim 11, further comprising a protective layer in physical contact with a top surface of the patterned light shielding layer.

14. The display panel of claim 13, wherein a material of the sidewall pattern is different than a material of the protective layer.

* * * * *